(12) United States Patent
Behl et al.

(10) Patent No.: US 10,040,880 B2
(45) Date of Patent: Aug. 7, 2018

(54) BIDIRECTIONAL SHAPE-MEMORY POLYMER, METHOD OF ITS PRODUCTION AND ITS USE

(71) Applicant: HELMHOLTZ-ZENTRUM GEESTHACHT ZENTRUM FÜR MATERIAL— UND KÜSTENFORSCHUNG GMBH, Geesthacht (DE)

(72) Inventors: Marc Behl, Berlin (DE); Karl Kratz, Berlin (DE); Ulrich Noechel, Berlin (DE); Tilman Sauter, Berlin (DE); Joerg Zotzmann, Berlin (DE); Srinivasa Reddy Chaganti, County Kildare (IE); Andreas Lendlein, Berlin (DE)

(73) Assignee: Helmholtz-Zentrum Geesthacht Zentrum fuer Material -und Kuestenforschung GmbH, Geesthacht (DE)

( * ) Notice: Subject to any disclaimer, the term of this patent is extended or adjusted under 35 U.S.C. 154(b) by 0 days.

(21) Appl. No.: 14/653,941

(22) PCT Filed: Dec. 20, 2013

(86) PCT No.: PCT/EP2013/077831
§ 371 (c)(1),
(2) Date: Jun. 19, 2015

(87) PCT Pub. No.: WO2014/096416
PCT Pub. Date: Jun. 26, 2014

(65) Prior Publication Data
US 2015/0344600 A1    Dec. 3, 2015

(30) Foreign Application Priority Data

Dec. 21, 2012   (EP) .................................... 12198927

(51) Int. Cl.
C08F 210/02    (2006.01)
B29C 61/06    (2006.01)
(Continued)

(52) U.S. Cl.
CPC .......... C08F 210/02 (2013.01); B29C 61/003 (2013.01); B29C 61/06 (2013.01);
(Continued)

(58) Field of Classification Search
CPC ........... C08F 210/02; C08J 3/248; H01F 1/42; B29C 61/003; B29C 61/06;
(Continued)

(56) References Cited

U.S. PATENT DOCUMENTS 8,901,253 B2 * 12/2014 Behl .................... B29C 61/003
525/444

FOREIGN PATENT DOCUMENTS

JP    2002-504585    2/2002
JP    2011506726 A    3/2011
(Continued)

OTHER PUBLICATIONS

Webster's II New Riverside University Dictionary; The Riverside Publishing Company, Reference Division, Houghton Mifflin Company; One Beacon Street, Boston, MA; 1984; p. 1155.*
Junjun Li et al: "Semi-crystalline two-way shape memory elastomer". Polymer, 2011, vol. 52, p. 5320-5325.
International Search Report dated Sep. 29, 2014 in International Application No. PCT/EP14/062697.
Behl et al., "Reversible bidirectional shape-memory polymers", Adv Mater (Jun. 13, 2013) 25: 4466-4469.
International Search Report from PCT/EP2013/077831 dated Sep. 26, 2014.

*Primary Examiner* — Rabon Sergent
(74) *Attorney, Agent, or Firm* — Fox Rothschild LLP

(57) ABSTRACT

The present invention relates to an article consisting of or comprising a bidirectional shape-memory polymer (bSMP), the bSMP comprising: first phase-segregated domains (AD) having a first transition temperature ($T_{t,AD}$) corresponding to a crystallization transition or glass transition of the first domains (AD), second phase-segregated domains (SD) having a second transition temperature ($T_{t,AD}$) corresponding to a crystallization transition or glass transition of the second domains (SD), the second transition temperature ($T_{t,SD}$) being higher than the first transition temperature ($T_{t,AD}$), and covalent or physical bonds cross-linking the polymer chains of the bSMP, and in this way interconnecting the first and second domains (AD, SD), wherein the second phase-separated domains (SD) form a skeleton which is at least partially embedded in the first phase-segregated domains (AD), and wherein polymer chain segments of the bSMP forming the first domains (AD) are substantially orientated in a common direction, such that the bSMP is able to undergo a reversible shape-shift between a first shape (A) at a first temperature ($T_{high}$) and a second shape (B) at a second temperature ($T_{low}$) upon variation of temperature between the first and second temperature ($T_{high}$, $T_{low}$) driven by the crystallization and melting or vitrification and melting of the first phase-separated domains (AD) and without application of an external stress, with $T_{low} < T_{t,AD} < T_{high} < T_{t,SD}$.

16 Claims, 13 Drawing Sheets

(51) Int. Cl.
    *C08G 81/02*     (2006.01)
    *H01F 1/42*     (2006.01)
    *C08G 18/42*     (2006.01)
    *C08G 63/91*     (2006.01)
    *B29C 61/00*     (2006.01)
    *C08J 3/24*     (2006.01)

(52) U.S. Cl.
    CPC ......... *C08G 18/4277* (2013.01); *C08G 63/91* (2013.01); *C08G 81/021* (2013.01); *C08G 81/027* (2013.01); *C08J 3/248* (2013.01); *H01F 1/42* (2013.01); *C08G 2280/00* (2013.01)

(58) Field of Classification Search
    CPC .. C08G 18/4277; C08G 63/91; C08G 81/021; C08G 81/027; C08G 2280/00
    See application file for complete search history.

(56) References Cited

FOREIGN PATENT DOCUMENTS

| | | |
|---|---|---|
| WO | 9942528 A2 | 8/1999 |
| WO | 199942528 A2 | 8/1999 |
| WO | 2007060019 A2 | 5/2007 |
| WO | 2009095434 A1 | 8/2009 |
| WO | WO 2010/049486 A2 * | 3/2010 |

* cited by examiner (a)

(b)

(a)

(b)

(a)

(b)

(a)

(b)

BIDIRECTIONAL SHAPE-MEMORY POLYMER, METHOD OF ITS PRODUCTION AND ITS USE

CROSS-REFERENCE TO RELATED APPLICATIONS

This application is a § 371 national stage entry of International Application No. PCT/EP2013/077831, filed Dec. 20, 2013, which claims priority to and the benefit of European Application No. 12198927.1, filed Dec. 21,2012, both of which are hereby incorporated herein by reference in their entireties.

The present invention is related to an article consisting of or comprising a bidirectional shape-memory polymer (bSMP), a method of its production and a method of its use.

Conventional shape-memory polymers are able to undergo a shape transition from a "programmed" temporary shape to a memorized permanent shape. However, this is a one-way effect, as a further shape transition requires a renewed thermo-mechanical programming process. In one-way SMPs, the same type of switching domains provides two functions: temporary fixation of a programmed temporary shape and elastic recovery of the permanent shape (Lendlein, A. & Kelch, S. Shape-memory polymers. Angew. Chem. Int. Ed. 41, 2034-2057(2002). The thermal transition ($T_{trans}$) of the switching domains such as melting ($T_m$) or glass ($T_g$) transition acts as a switch for the shape-memory effect. During a deformation at $T>T_{trans}$ of shape A by application of external stress, the polymer chain segments forming the switching segments are oriented, which results in a decreased state of entropy. Cooling to $T<T_{trans}$ causes the solidification of switching domains e.g. by crystallization or vitrification and in this way the fixation of shape. This process where shape-memory function is created is named programming. The memorized (permanent) shape is recovered by application of heat. Upon exceeding $T_{trans}$, the oriented chain segments recoil driven by a gain in entropy, which irreversibly erases the geometry information of the temporary shape. Thus, the shape-memory effect in conventional one-way SMPs can only be triggered once. For a further shape transition via the shape-memory effect, a new programming process is required.

BRIEF DESCRIPTION OF THE INVENTION

Object of the present invention is to provide a polymer or an article comprising the polymer capable of reversibly switching between two shapes without the need of renewed process for defining the shapes (programming). The reversible shape shift should be accomplished without application of an external force. In other words, a self-supporting bidirectional shape-memory polymer (hereinafter also referred to as bSMP) shall be provided.

This problem has not been solved yet. All known stress-free shape-memory polymers require a renewed programming of the temporary shape after induction of the shape-memory effect, i.e., they are unidirectional. Until now, applying a constant stress has been a prerequisite for a successful reversible switching of polymers.

This problem is solved by an article, a method of its preparation and a method of its use as defined in the independent claims. Preferred embodiments of the invention are defined by the dependent claims.

The article according to the present invention consists of or comprises a bidirectional shape-memory polymer (bSMP). The bSMP comprises:

first phase-segregated domains AD having a first transition temperature $T_{t,AD}$ corresponding to a crystallization transition or glass transition of the first domains AD;

second phase-segregated domains SD having a second transition temperature $T_{t,SD}$ corresponding to a crystallization transition or glass transition of the second domains SD, the second transition temperature $T_{t,SD}$ being higher than the first transition temperature $T_{t,AD}$, and covalent or physical bonds cross-linking the polymer chains of the bSMP, and in this way interconnecting the first and second domains AD, SD, wherein the second phase-separated domains SD form a skeleton which is at least partially embedded in the first phase-segregated domains AD, and wherein polymer chain segments of the bSMP forming the first domains AD are substantially orientated in a common direction, such that the bSMP is able to undergo a reversible (bidirectional) shape-shift between a first shape A at a first temperature $T_{high}$ and a second shape B at a second temperature $T_{low}$ upon (direct or indirect) variation of temperature between the first temperature $T_{high}$ and the second temperature $T_{low}$, the reversible shape-shift being driven by the crystallization and melting or vitrification and melting of the first phase-separated domains AD and without application of an external stress, with $T_{low}<T_{t,AD}<T_{high}<T_{t,SD}$.

The invention solves the technical problem of reversibility, while simultaneously maintaining the shape by the preparation of a multiphase polymer system, in which one phase (hereinafter referred to as skeleton domain SD) is responsible for maintaining the shape, whereas the other phase (hereinafter referred to as actuator domain AD) functions as a reversible actuator. Until now, in conventional unidirectional SMPs one phase (the switching phase) has been used both for shape maintenance and actuation. The invention solves the problem by assigning the two functions to different phases (or transition temperature ranges) which are covalently or physically interconnected at the molecular level.

According to a preferred embodiment of the invention, the bSMP comprises in addition to the first and the second phase-segregated domains AD, SD a third domain ED having a third transition temperature $T_{t,ED}$ corresponding to a glass transition of the third domain, wherein the third transition temperature is lower than the transition temperature $T_{t,AD}$ of the first domain AD (and the transition temperature $T_{t,SD}$ of the second domain SD). Hence in the temperature range of use of the bSMP, the third domain ED is in the molten, elastic state. Together with the first domains AD, the third domains embed the skeleton provided by the second domains SD. The third domain provides elasticity to the bSMP and is thus also referred to as elastic domain ED. The article according to this aspect consists of or comprises a bidirectional shape-memory polymer (bSMP), the bSMP comprises:

first phase-segregated domains AD having a first transition temperature $T_{t,AD}$ corresponding to a crystallization transition or glass transition of the first domains AD, second phase-segregated domains SD having a second transition temperature $T_{t,SD}$ corresponding to a crystallization transition or glass transition of the second domains SD, the second transition temperature $T_{t,SD}$ being higher than the first transition temperature $T_{t,AD}$, third phase-segregated domains ED having a third transition temperature $T_{t,ED}$ correspond-ding to a glass transition of the third domains ED, the third transition temperature $T_{t,ED}$ being lower than the first and second transition temperature $T_{t,AD}$, $T_{t,SD}$, and covalent or physical bonds cross-linking the polymer chains of the bSMP, and in this way interconnecting the first, second and third domains ED, AD and SD, wherein the second phase-separated domains SD form a skeleton which is at least partially embedded in the first phase-segregated domains AD and the third phase-segregated domains ED, and wherein polymer chain segments of the bSMP forming the first domains AD are substantially orientated in a common direction, such that the bSMP is able to undergo a reversible shape-shift between a first shape A at a first temperature $T_{high}$ and a second shape B at a second temperature $T_{low}$ upon (direct or indirect) variation of temperature between the first and second temperature ($T_{high}$, $T_{low}$) driven by the crystallization and melting or vitrification and melting of the first phase-separated domains (AD) and without application of an external stress, with $T_{t,ED} < T_{low} < T_{t,AD} < T_{high} < T_{t,SD}$.

At a temperature below the transition temperature $T_{t,SD}$ of the phase-segregated skeleton domains SD, i.e. in a state where the skeleton domains are solidified (crystallized or vitrified), the article has an overall geometry which is fixed by the second phase-segregated domains. The overall geometry (as formed by a programming procedure set forth below) determines the first and the second shape A, B which are recalled during the reversible bidirectional shape shift.

The first phase-separated actuator domains AD may be formed by polymer segments that are chemically different to those of the second phase-segregated domains SD. Segregated domains of chemically different nature may be provided by segregated block segments in a block copolymer. Chemically different actuator and skeleton domains may also be implemented by segregated polymer phases in a physical mixture (blend) of different polymers or in a covalently cross-linked polymer network of different polymers. A non-limiting example for a polymer system comprising chemically different actuator and skeleton domains is shown in the experimental section in form of the multiphase copolyester urethane network PPDL-PCL comprising poly (ω-pentadecalactone) segments acting as skeleton domains SD and poly(s-caprolactone) segments acting as actuator domains.

According to an alternative embodiment of the invention the first phase-separated domains AD are formed by polymer segments that are chemically identical to those of the second phase-segregated domains SD. According to the identical nature the transition temperature of the actuator and skeleton domains is expected to be the same. However, due to the molecular environment of the phase segregated domains in the bSMP, there is a difference between the transition temperatures $T_{t,AD}$ and $T_{t,SD}$, which usually overlap resulting in one broad transition region. Within this transition region, the phase associated to the lower range acts as actuator domain and the phase associated to the higher range acts as skeleton domain stabilizing the overall shape of the bSMP. A non-limiting example for a polymer system comprising chemically identical actuator and skeleton domains is shown in the experimental section in form of covalently cross-linked poly[ethylene-co-(vinyl acetate)] (cPEVA). In this polymer system both, the actuator and skeleton domains are established by crystalline polyethylene phases.

The overall geometry of the article may be produced by deforming the bSMP by application of an external stress, at a temperature $T_{reset}$ which is higher than the transition temperature $T_{t,SD}$ of the second domains SD, so that the polymer is in a rubbery-elastic state, and subsequently cooling the deformed bSMP to a temperature below the transition temperature $T_{t,SD}$ of the second domains SD or, preferably, below the transition temperature $T_{t,AD}$ of the first domains AD under maintaining the external stress. Upon cooling, the skeleton domains are solidified (by crystallization or vitrification) and thus stabilize the overall geometry of the article as determined by the deformation stress. In this way the bidirectional shape-shift effect bSME is implemented in the polymer system. This procedure is named "programming". The programming may also comprise a further step of releasing the external stress after cooling and/or heating to a temperature above the transition temperature $T_{t,AD}$ of the actuator domains AD.

Preferably, the polymer chain segments of the bSMP forming the skeleton domains SD are substantially orientated in a common direction (in the same way as the chain segments of the of the actuator domains). The direction of orientation of the actuator domains AD and/or skeleton domains SD is determined by the deformation.

The bSMP may a single polymer and the segments constituting the first domains AD, the second domains SD and, if applicable, the third domains ED are located on the same polymer chain. Alternatively, the bSMP may be a blend, i.e. a physical mixture of two or more polymers, or an interpenetrated polymer network. In this case the segments constituting the first domains AD, the second domains SD and if applicable the third domains ED are located on different polymer chains.

According to a preferred embodiment of the invention, the article consists of or comprises a bSMP composite material composed of the bSMP as described before and a particulate material embedded therein. The particulate material may be selected from magnetic particles, electrically conductive particles, infrared sensitive particles and microwave sensitive particles. In this way, the material can be heated indirectly by means of a magnetic field, inductively, by infrared radiation, or by high frequency electromagnetic fields typically in the range of radio frequency (RF) and microwave (MW), respectively, rather than by raising the environmental temperature. Examples of microwave sensitive particles comprise silicon carbide, boron carbide and graphite)

A further aspect of the present invention is related to a method of preparing the article according to the invention. The method comprises the steps of providing a polymer comprising first phase-segregated domains AD having a first transition temperature $T_{t,AD}$ corresponding to a crystallization transition or glass transition of the first domains AD, second phase-segregated domains SD having a second transition temperature $T_{t,SD}$ corresponding to a crystallization transition or glass transition of the second domains SD, the second transition temperature $T_{t,SD}$ being higher than the first transition temperature $T_{t,AD}$, and covalent or physical bonds cross-linking the polymer chains of the bSMP and in this way interconnecting the first and second domains AD, SD, deforming the polymer by application of an external stress at a temperature $T_{reset}$ which is higher than the transition temperature $T_{t,SD}$ of the second domains SD so that the polymer is in a rubbery-elastic state, and cooling the polymer to a temperature below the transition temperature $T_{t,SD}$ of the second domains SD or below the transition temperature $T_{t,AD}$ of the first domains AD under maintaining the external stress, thereby forming a structure, in which polymer chain segments of the bSMP forming the second domains SD form a skeleton, which is at least partially embedded in the first domains AD, and in which polymer chain segments of the bSMP forming the first domains AD are substantially orientated in a common direction, such that the bSMP is able to undergo a reversible shape-shift between a first shape (A) at a first temperature $T_{high}$ and a second shape B at a second temperature $T_{low}$ upon variation of temperature between the first and second temperature $T_{high}$, $T_{low}$ driven by the crystallization and melting or vitrification and melting of the first phase-separated domains AD and without application of an external stress, with $T_{low} < T_{t,AD} < T_{high} < T_{t,SD} < T_{reset}$.

After having performed this programming procedure, the external stress can be released and the reversible bidirectional shape-memory effect is implemented in the polymer. In other words, after programming or functionalizing the polymer in this way, it is capable of being reversibly switched between two shapes A and B by direct or indirect temperature variation between $T_{low}$ and $T_{high}$.

Preferably, the method further comprises the step of releasing the external stress and heating the polymer to the first temperature $T_{high}$ resulting in the first shape A. This step is particularly advantageous for polymer systems in which actuating domains AD and skeleton domains SD are formed by polymer segments that are chemically identical to each other, as the selection of $T_{high}$ separates the domains SD and AK from each other and allocates the function of stabilizing the overall geometry and of bidirectional shape-shifting to these domains, respectively.

The function of the deformation step is first to orientate the actuator domains and, second, to assign a desired overall geometry and thus the temporary shapes A and B to the article. The deformation may comprise an elongation, compression, bending of the polymer or any combination thereof. Preferably, the deformation comprises elongation of the polymer or a complex deformation including elongation, such as bending.

According to a particular useful embodiment, the deformation of the polymer comprises a surface texturing of the polymer, for instance by using a template having a corresponding surface structure and embossing the rubbery-elastic polymer surface with the template. In this way, a surface structure is created on the polymer which can reversibly be changed by varying the temperature. For example, if the surface texture comprises embossed grooves, channels or circular depressions, their heights or depths can be varied by the bSME. Alternatively, the deformation of the polymer may comprise smoothing of a surface that already has a textured structure. In this way, the article can be switched between a smooth surface and a textured surface. In any case, it is preferred that the texture comprises structure elements, such as grooves, channels circular depressions and/or bumps. The texture may comprise a regular or periodic pattern or a random from. Preferably, the dimension of the texture or structure elements thereof is in the micrometer or nanometer scale.

Still a further aspect of the invention is related to a method of using the article according to the invention, i.e. a method of switching the article between the temporary shapes A and B being determined by the programming process set forth above. The method of using the article comprises the step of varying the temperature between a first temperature $T_{high}$ and a second temperature $T_{low}$, with $<T_{t,AD}<T_{high}<T_{t,SD}$, without application of an external stress, such as to induce a reversible shape-shift of the bSMP between a first shape A at the first temperature $T_{high}$ and a second shape B at the second temperature $T_{low}$ driven by the crystallization and melting or the vitrification and melting of the first phase-separated domains AD. The reversible shift in shape takes place in a freestanding or stress-free manner, i.e. without application of an external deformation stress.

The variation in temperature can be achieved directly by varying the environmental temperature. In case the bSMP is a composite material comprising magnetic, electrically conductive, IR sensitive or microwave sensitive particles, heating can be achieved indirectly by applying an external alternating magnetic field, by infrared radiation or by applying a high frequency electromagnetic field typically in the range of radio frequency (RF) and microwave (MW).

The invention further relates to applications of the inventive bSMPs. They comprise, for instance:

fibers, functional textiles, fabrics with bSME for industrial, medical or sports applications (e.g. elastic stockings or other elastic textiles that can be put on when they are widened and that exhibit their reversible compression effect when they are warmed up to body temperature);

films, reusable shrink films, films that can be deposited onto textiles;

medical products, such as medical catheters, tubing, tubes that can move;

reversible anchorable implants (e.g. magnetically switchable nanocomposites);

thermally switchable systems that release active substances;

reversibly switchable microparticles, microstructures;

printable bSMP precursors;

devices (heat engines) for the storage/conversion of heat/temperature differences into motion (motors);

household goods, e.g. reversibly sealable receptacles.

However, a large number of other applications are possible on account of the novelty of the effect.

The fact that the bSMPs according to the invention can reversibly change their shapes, while it is not necessary to apply a stress to the material, can be regarded as a key issue of the inventive solution. The change in shape is performed between two self-supporting shapes A and B, wherein it is not necessary to program shapes A and B again. However, the overall shape can be programmed and reprogrammed creating new shapes A' and B'.

In the following the invention will be discussed in more detail with reference to the following figures:

In conventional one-directional SMPs according to the state of the art, the same type of switching domains provides two functions: temporary fixation of the so-called temporary shape and elastic recovery of the permanent shape. The thermal transition ($T_{trans}$ or $T_t$) of the switching domains such as melting ($T_m$) or glass ($T_g$)transition acts as a switch for the shape-memory effect. During a deformation at $T>T_{trans}$ of the temporary shape by application of external stress, the polymer chain segments forming the switching segments are oriented, which results in a decreased state of entropy. Cooling to $T<T_{trans}$ causes the solidification of switching domains e.g. by crystallization or vitrification and in this way the fixation of the permanent shape. This process where shape-memory function is created is named programming. The memorized permanent shape is recovered by application of heat. Upon exceeding $T_{trans}$, the oriented chain segments recoil driven by a gain in entropy, which irreversibly erases the geometry information of temporary shape. For achieving a further shape shift the one-way SMP again needs to be programmed.

Figure 1:
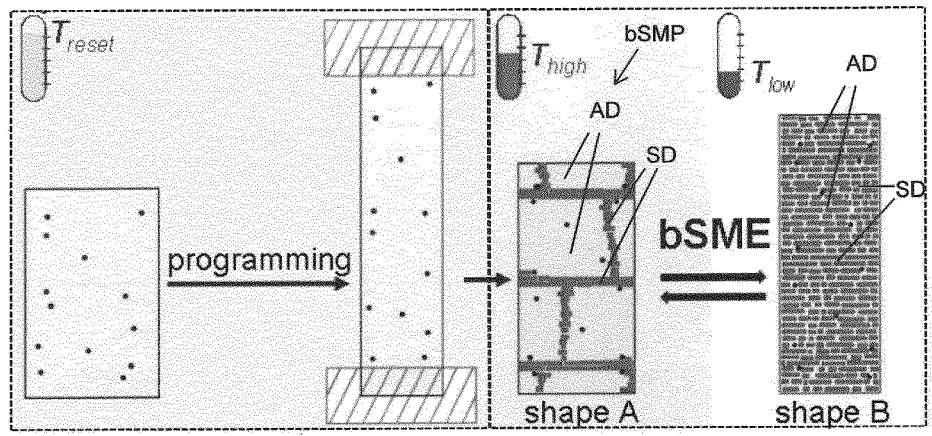
FIG. 1 Scheme of the bidirectional shape-memory effect (bSME) for copolymer networks: After deformation at $T_{reset}$ the skeleton domains (SD), which determine the shape shifting geometry, are crystallized/vitrified by cooling (programming procedure). The bSME is triggered by the reversible crystallization/vitrification and melting of oriented actuator domains (AD). Black dots symbolize crosslinks.

The principle of the bidirectional shape-memory polymer bSMP according to the present invention is schematically shown in FIG. 1, where the programming mechanism is depicted on the left and the reversible switching between two shapes A and B triggered by the bidirectional shape-memory effect bSME on the right side. In the following, the principle of the invention is explained for (semi)crystalline skeleton and actuator domains having a thermal melting/crystallization transition. However, the principle also works with amorphous skeleton and actuator domains having a thermal glass transition.

In the bSMP according to the invention, the two functions (temporary fixation of a first shape A and elastic recovery of a second shape B) are assigned to two separate structural units, which are linked to each other on the molecular level. Here, as structural units two crystallisable domains are selected having melting temperatures $T_m$ as transition temperatures $T_t$. The domains associated with the higher melting temperature ($T_{t,SD}$) determine the shape shifting geometry of the material and are referred to skeleton domains SD. The domains associated with the lower melting temperature ($T_{t,AD}$) are responsible for the actuation of the bSME and are therefore referred to as actuator domains AD. The actuation capability is obtained by conformational orientation of the chain segments within the domains AD, which result in reversible directed length changes of the actuator domains AD during their crystallization and melting. Therefore, the key issue of the present invention is to provide a skeleton of soldificated (crystallized or vitrified) geometry determining domains, the skeleton domains SD, in such a way that the chains within the actuator domains AD are oriented in the direction of the targeted macroscopic shape-shift. The process required for implementing the chain segment orientation and the macroscopic shape shifting geometry in the polymeric material is named programming.

Referring to FIG. 1, at $T_{reset}$ which is above $T_{t,SD}$ of the skeleton domains SD and above $T_{t,AD}$ of the actuator domains AD, the polymer is in a rubbery-elastic state, i.e. it does not contain any crystal domains. At $T_{reset}$ both, the actuator domains AD and the skeleton domains are in a molten state. At this temperature, the polymer is macroscopically deformed according to a desired overall appearance and to a desired shifting geometry. For instance, the macroscopic deformation comprises stretching (FIG. 1, left side). Thereby, all chain segments are oriented. Cooling under the deformation stress to $T_{low}$, which is below the transition temperature $T_{t,SK}$ of the skeleton domains SD and below $T_{t,AD}$ of the actuator domains AD, causes all domains to solidify (i.e. to crystallize in case of (semi)crystalline AD and SD or to vitrify in case the domains having a glass transition). Release of the stress is associated with a contraction/shrinking of the bSMP resulting in shape B (FIG. 1, right side). Crystallization or vitrification of skeleton domains SD gives rise to the formation of a skeleton structure embedded in the actuator domains AD oriented in the direction of deformation. Shape A is achieved after heating to $T_{high}$, which is between both transition temperatures of AD and SD ($T_{low} < T_{t,AD} < T_{high} < T_{t,SD}$). The bSME is now implemented in the material.

Crystallization of the oriented actuator segments AD by cooling to $T_{low}$ again results in shape B. Reheating to $T_{high}$ causes the actuator domains AD to melt and the chain segments enabling the reversible shape shift to shape A to recoil. This heating and cooling cycle between $T_{low}$ and $T_{high}$ is called reversibility cycle and can be repeated several times (FIG. 1, right side).

Figure 2:
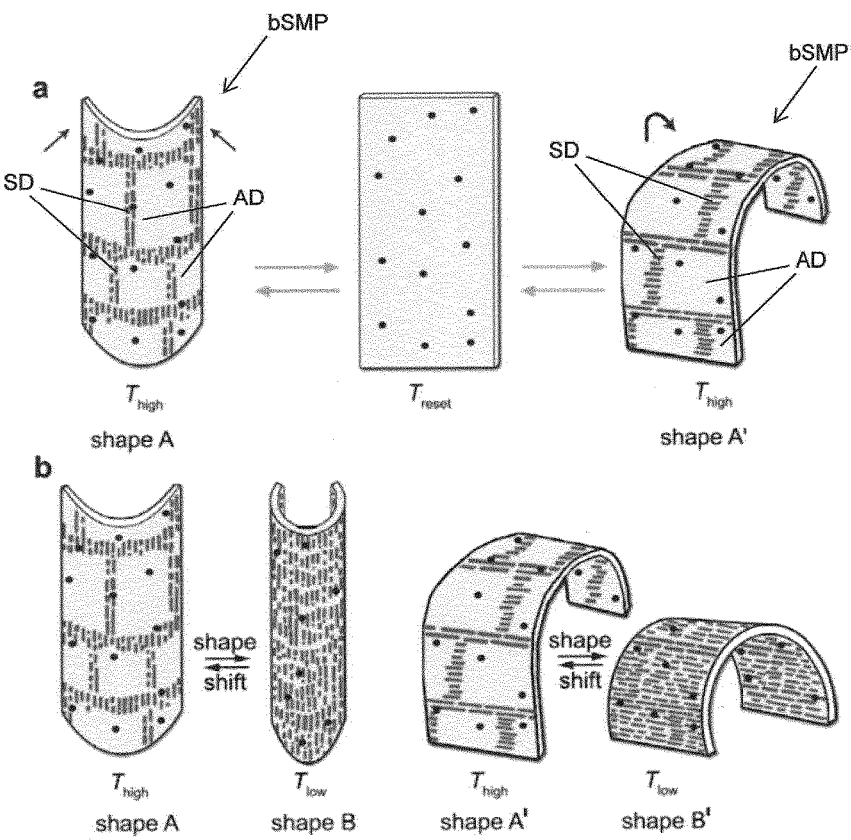
FIG. 2 Working principle of a bSMP. (a) Programming: the overall appearance is determined by the directed crystallization/vitrification of the internal skeleton forming domains (SK). ●: chemical crosslinks, ←: steps of transformation. (b) Actuation: reversible shape shifts by crystallization/melting or vitrification/melting of oriented polymer segments in the actuation domains (AD).

As shown in FIG. 2, reheating to $T_{reset}$, i.e. bringing the polymer in a viscoelastic state, allows a new programming process of a new bodies appearance. For instance, bending the polymer sheet along its length extension and subsequent cooling under stress results in bended shape A. Reheating to $T_{reset}$ melts the skeleton domains SD and erases the programmed shape A. Bending the bSMP sheet along its width extension at $T_{reset}$ and subsequent cooling under stress gives rise to a new bridge appearance, shape A' (FIG. 2a). In each case, the bodies' overall appearance is determined by the solidified (crystallized) skeleton domains SD. Covalent (i.e. chemical) or non-covalent (physical) netpoints shown as dots connecting the chain segments enable orientation of the chain segments in the visco-elastic state at $T_{reset}$.

Furthermore, once the polymer body has been programmed, variation of the temperature between $T_{low}$ and $T_{high}$ (with $T_{low} < T_{t,AD} < T_{high} < T_{t,SD}$) reversibly switches the polymer body between the two shapes A and B or A' and B', respectively, which are determined by the programming process (FIG. 2b). This bidirectional shape-memory effect is driven by the solidification and melting of the oriented actuator domains AD.

Methods

DSC: Cyclic, thermo-mechanical tensile tests, which were conducted with a standardized sample shape (ISO 527-2/1BB) on a Zwick Z1.0 machine equipped with a thermo-chamber and a 200 N load cell.

The experiments usually consisted of an initial skeleton formation module (programming) and several subsequent reversible shape-shifting cycles. In the skeleton formation module, the sample was deformed according to a desired form to $\Sigma_{def}$ at $T_{reset}$ and equilibrated for 5 min. After cooling to $T_{low}$ under constant strain and 10 min equilibration time the sample was reheated to $T_{high}$ under stress-free conditions, resulting in shape A. The reversible shape-shifting cycle consisted of cooling to $T_{low}$ waiting for 10 min and reheating to $T_{high}$ followed by another waiting period of 10 min. Heating and cooling rates were 1 K·min$^{-1}$.

SAXS: SAXS 2D-scattering patterns were integrated (using SAXS-software from Bruker AXS) after background subtraction over a 10° wide chi range along the $s_3$ axis (deformation direction), where discrete peaks were observed, leading into a one-dimensional curve I versus $s_3$. Longperiods were determined from the position of the peak maxima after Lorentz correction (I(s)→s$^2$I(s)) as L=1/$s_L$ and were provided as the average from the measurements in the reversibility cycles with $T_{high}$ and $T_{low}$. 2D-patterns were processed as follows: After background subtraction and correction for exposure time and sample absorption, invalid pixels (e.g. beamstop) were masked. Patterns were rotated to match their fibre axis in vertical direction. The fibre symmetric patterns were harmonized (4 quadrant symmetry) and the central spot was filled. Patterns are presented in the region of interest (~0.4 nm$^{-1}$) in pseudo-colors. Furthermore the chord distribution function (CDF) was calculated in order to extract structural information. Here the patterns were projected on the fibre plane ($s_{1,2}$ $s_3$) and the interference function was calculated. By Fourier transformation the CDF was obtained, representing the nanostructure in real space (r1,2 r3), as well as domains sizes and distances.

EXAMPLE 1

PPDL-PCL

In this example the bSME behavior of a bSMP was examined in which the actuator domains AD and skeleton domains SD are associated to chemically different segments. For this purpose a multiphase copolyester urethane network PPDL-PCL was used. The PPDL-PCL is composed of poly(ω-pentadecalactone) (PPDL) segments acting as the geometry determining skeleton domains (SD) and poly(ε-caprolactone) (PCL) segments providing the actuator domains (AD).

The PPDL-PCL was prepared from a star shaped PPDL-triol and a star shaped PCL-tetraol reacted with a mixture of the two isomers 1,6-diisocyanato-2,2,4-trimethylhexane and 1,6-diisocyanato-2,4,4-trimethylhexane.

Figure 3:
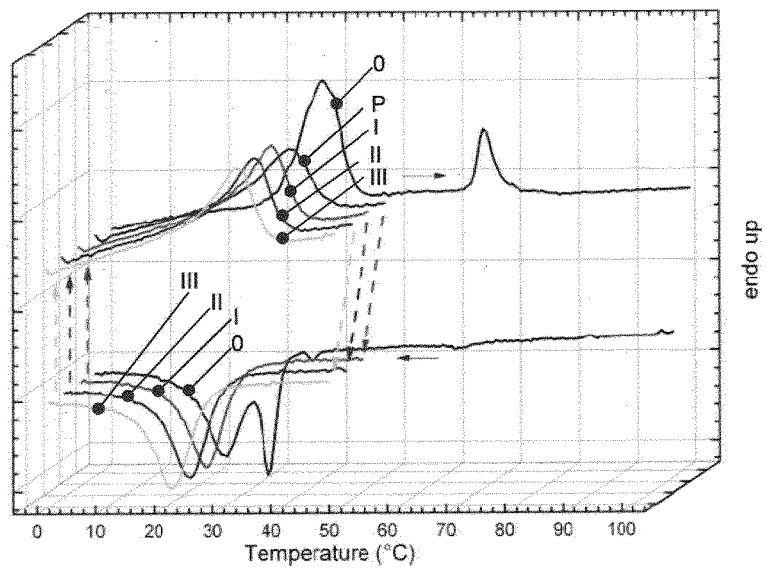
FIG. 3 DSC investigation of a PPDL-PCL polymer system following the temperature profiles of programming and three subsequent reversibility cycles. Line 0: initial heating and cooling, line P: programming, line I: first cycle, line II: second cycle, line III: third cycle. $T_{reset}$=100° C., $T_{high}$=50° C., $T_{low}$=0° C.

Differential scanning calorimetry (DSC) measurements were made in order to determine the melting temperatures of the PPDL and PCL domains and to select suitable values for the parameters $T_{reset}$, $T_{high}$, and $T_{low}$ for subsequent bSME measurements. Plot 'O' in FIG. 3 shows the enthalpy versus temperature during the first heating. Upon heating to $T_{reset}$=100° C. two peaks were observed associated to melting of PCL domains at $T_{m,AD}$=34° C. and of PPDL domains at $T_{m,SD}$=64° C., respectively. In the cooling direction, three crystallisation peaks appeared, which were assigned to the crystallisation of the PPDL domains, mixed crystallisation of PPDL and PCL domains, and the crystallisation of the PCL domains. According to the $T_{m,AD}$ of PCL actuator domains, the temperatures for switching between shapes A and B were selected to $T_{high}$=50° C. and $T_{low}$=0° C.

For programming an overall shape, the PPDL-PCL polymer system was heated to $T_{reset}$=100° C., so that the polymer was completely in a rubbery-elastic state, and was deformed at this temperature according to a desired shape (plot P in FIG. 3) and cooled to $T_{low}$=0° C. (plot I, below). When the temperature was subsequently cycled in the selected temperature range applicable for the reversibility cycle ($T_{high}$=50° C. and $T_{low}$=0° C.) only one melting peak corresponding the melting of the PCL actuator domains was observed (plots I, II, III).

Figure 4:
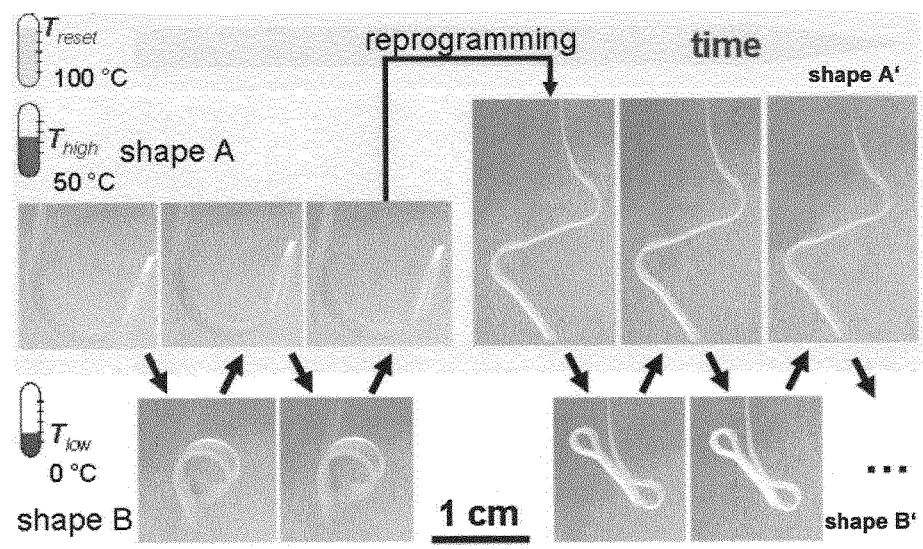
FIG. 4 Photo series showing the bSME of a polymer ribbon of PPDL-PCL after programming of two different shapes A and A'. The bowed shape A was obtained after first programming. The bSME occurred as reversible shift between shape A (bow) at $T_{high}$ and shape B (helix) at $T_{low}$. The sample was reprogrammed via $T_{reset}$ into an open shape (shape A'), which could be shifted reversibly to a folded shape (shape B').

In the Experiment shown in FIG. 4, a ribbon (40 mm×4 mm×0.4 mm) made of the PPDL-PCL polymer system was first deformed at $T_{reset}$=100° C. to form a bow-like first shape A and cooled to $T_{high}$=50° C. under maintaining the deformation stress (upper left side). Further cooling down to $T_{low}$=0° C. resulted in shape B, which in this case was a helix (lower left side). Cyclic heating and cooling between $T_{high}$ and $T_{low}$ reversibly switched between shape A and shape B.

Heating again to $T_{reset}$ erased shapes A and B from the memory of the polymer and allowed reprogramming of a different shape shifting geometry. Here, the material was programmed to assume an open folded shape A' (upper right side in FIG. 4). Subsequent cyclic cooling and heating between $T_{high}$ and $T_{low}$ resulted in the transition between the open folded shape A' and a tightly folded shape B'. This experiment showed that, it is possible to consecutively program in one and the same material coiling and folding mechanisms. The shape shifts occurred at the same temperature at independent from the shape shifting geometry.

Figure 5:
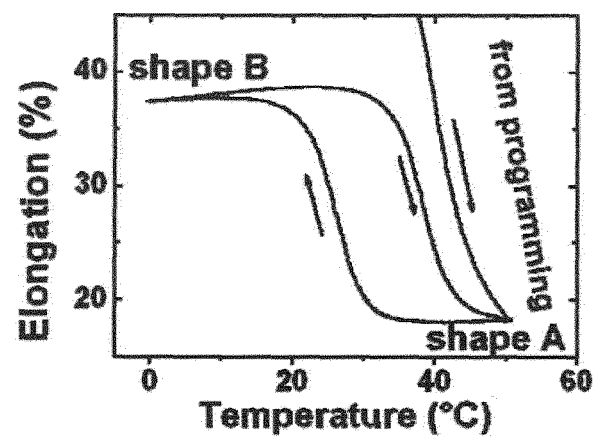
FIG. 5 Quantified cyclic, thermo-mechanical tensile tests regarding the bSME of PPDL-PCL. Parameters: $\varepsilon_{prog}$=40%, $T_{reset}$=100° C., $T_{high}$=50° C., $T_{low}$=0° C. (a): Elongation as function of temperature for the first reversibility cycle. (b): Elongation ε and temperature T versus time plot for the initial four reversibility cycles (E: upper line, T: bottom line).
Figure 5:
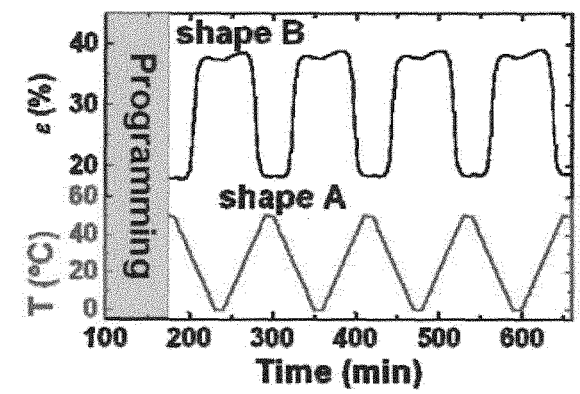

The bSME of the polymer PPDL-PCL was quantified by cyclic, thermo-mechanical tensile tests. These tests consisted of an initial programming and four reversibility cycles. The results of these investigations are displayed in FIG. 5a and b. In FIG. 5a elongation ε is plotted against temperature T for the first reversibility cycle. Shape A is characterized by $ε_A$ at $T_{high}$, which is stabilized by the crystalline geometry-determining PPDL domains. Upon cooling to $T_{low}$ the polymer shifted to shape B, whereby the increase in elongation to $ε_B$(~21%) was caused by the crystallization of the oriented actuator PCL domains. Heating to $T_{high}$ resulted in shape A again. Here, the switching temperatures $T_{sw}$(A→B) (27±1° C.) and $T_{sw}$(B→A) (38±1° C.) become apparent, whose difference corresponds to the temperature difference between the crystallisation temperature of the actuator domains (21±1° C.) and their melting temperature (34±1° C.) (see FIG. 3). In the following reversibility cycles, the sample shifted reversibly between shapes A and B within the margin of error (FIG. 5b).

Figure 6:
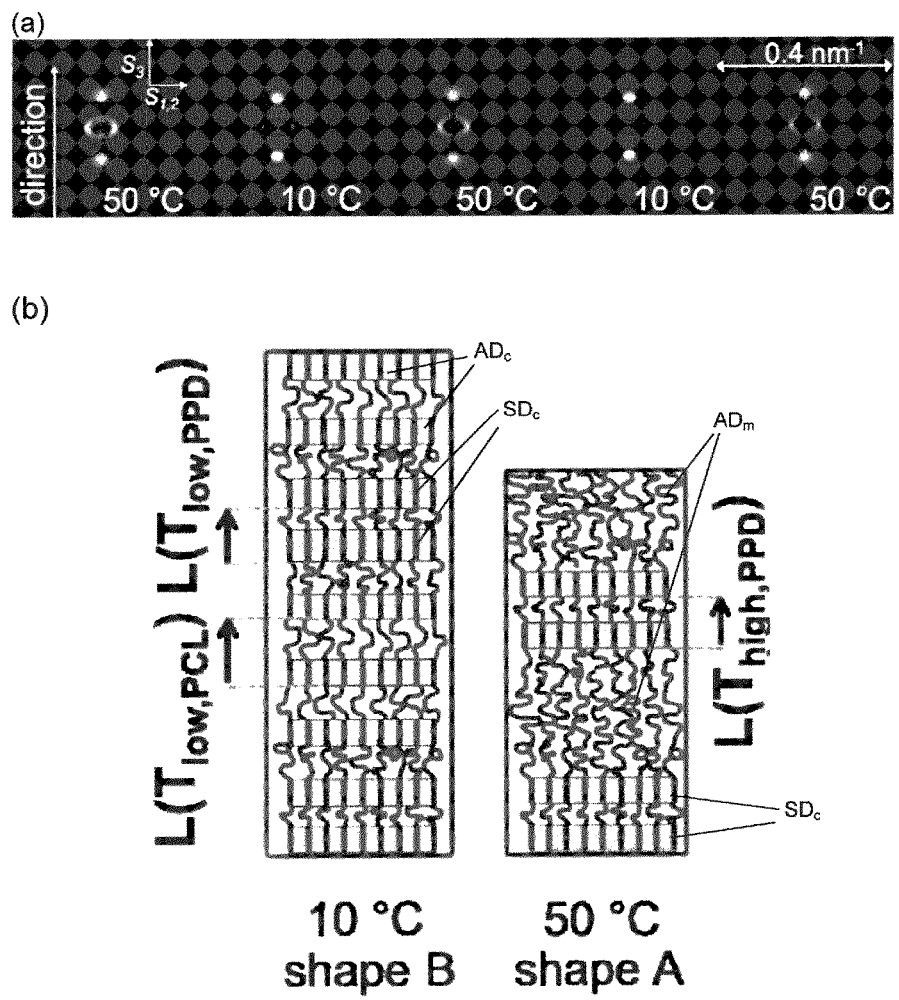
FIG. 6 (a): Structural changes occurring during the bSME of PPDL-PCL determined by 2D Small Angle X-ray Scattering (SAXS) recorded for shape A and shape B in subsequent reversibility cycles between $T_{high}$=50° C. and $T_{low}$=10° C. (b): Changes of long periods schematically shown during bSME of PPDL-PCL.

In situ small angle x-ray scattering (SAXS) measurements were performed to explore structural changes during bSME on the nanoscale for PPDL-PCL. FIG. 6a shows the SAXS data and FIG. 6b a corresponding scheme. Similar scattering patterns were found for shape A at $T_{high}$ and for shape B at $T_{low}$ during several cycles, thereby confirming excellent reversibility of bSME on this hierarchical level. At $T_{high}$ the achieved anisotropic scattering pattern can be attributed solely to the crystalline, geometry-determining PPDL domains. These consisted of crystalline and amorphous lamella oriented orthogonally to the direction of the extension applied during programming. Here, a longperiod, which is the average distance between two crystalline lamellae consisting of a crystalline and an amorphous part, was determined from SAXS data via analysis of the chord distribution function (CDF)20 for shape A with $L(T_{high,PPDL})$=11.8±0.4 nm. In contrast, at 10° C. (shape B) the crystallised PCL and PPDL domains contribute to the apparent $L(T_{low,app})$=13.8±0.2 nm. This behaviour can be attributed to the phase segregation in the copolymer network, where crystallites within one phase are surrounded by crystallites of the same kind. Therefore it can be assumed that the internal structure of the PPDL phase remained unchanged during bSME $L(T_{low,PPDL})$=$L(T_{high,PPDL})$. The apparently observed increase of the longperiod can be attributed to the contribution of the semi-crystalline PCL phase, whose weight content is three times higher in PPDL-PCL than in PPDL. This explanation is supported by a similar $L(T_{low,PCL})$=15.1 nm determined for a polyester urethane network, which is based solely on PCL.

Figure 7:
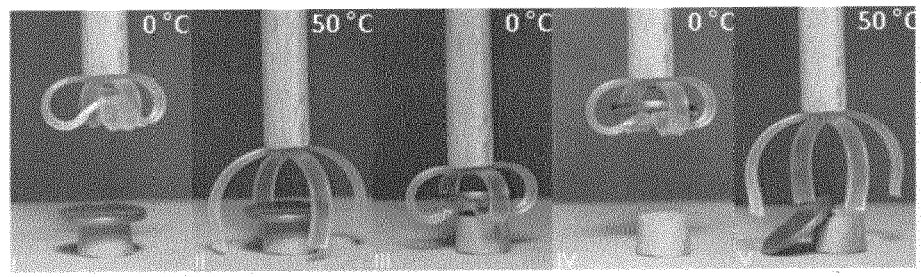
FIG. 7 Photo series of a gripper device made from PPDL-PCL reversibly catching and releasing a penny.

For demonstrating a practical application of the bSMP, a gripper device was constructed using the PPDL-PCL polymer system as shown in FIG. 7. The gripper was created by mounting two PPDL-PCL ribbons on a wooden rod. The polymer ribbons were connected as to cross each other and to provide four gripping teeth. Before mounting, the polymer ribbons were programmed into a closed shape at $T_{low}$=0° C. When heated to $T_{high}$=50° C. the gripper opened and was placed above a penny, which was caught when cooled to $T_{low}$ again. Heating to $T_{high}$ reversibly released the penny.

In another application example not shown here, a heat engine driven by the bSMP was designed, which was based on two PPDL-PCL elements. A first, concertina shaped PPDL-PCL drive element moved an attached toothed rack forward when heated to $T_{high}$ and back when cooled to $T_{low}$. During the forward motion, the second PPDL-PCL actuating element pressed the rack against a toothed wheel. Upon cooling to $T_{low}$ the actuator contracts resulting in a lower pressure on the rack enabling the concertina shaped drive element to contract as well. Within six cycles a ~120° counter clockwise rotation of the wheel was achieved.

EXAMPLE 2 cPEVA

In this example the bSME behavior of a bSMP was examined in which the actuator domains AD and skeleton domains SD are associated to chemically identical segments. For this purpose a commercially relevant plastic, namely covalently crosslinked poly[ethylene-co-(vinyl acetate)] (PEVA) was used. PEVA comprises crystallisable polyethylene (PE) segments and amorphous poly(vinyl acetate) segments.

cPEVA was prepared by mixing 98 g poly[ethylene-co-(vinyl acetate)] (PEVA) having a VA-content of 18 wt % (Elvax460, DuPont) and 2 g dicumyl peroxide (Sigma-Aldrich) as thermally-induced radical initiator in a twin-screw extruder (EuroPrismLab, Thermo Fisher Scientific) at 110° C. and 50 rpm. This blend was compression molded into films with 1 mm thickness and subsequently crosslinked at 200° C. and 20 bar for 25 min resulting in crosslinked PEVA (cPEVA).

In the cPEVA polymer system, the skeleton and the actuation function are based on the same material component so that an interchange between both functions is possible. The interchange is realized in a semicrystalline polymer network providing a broad $T_m$ range. The crystallites related to the $T_m$ range above a higher melting temperature ($T_{high}$) provide the internal skeleton SD, which determines the bodies' appearance and can be repeatedly reshaped by melting, deformation and crystallization (FIG. 2a). The crystallization and melting of oriented polymer chain segments related to the $T_m$ range below $T_{high}$ enable the actuation function by crystallization induced elongation and melting induced contraction (FIG. 2b). Furthermore, covalent netpoints connecting the chain segments, which enable orientating the chain segments in the viscoelastic state at a temperature $T_{reset}$ ($T_{high}$<$T_{reset}$) by macroscopic deformation. Both, the netpoint density determining the orientation capability but also the elasticity as well as the proper selection of $T_{high}$ controlling the ratio of polymer chain segments acting as skeleton or as actuators, are critical factors.

Figure 8:
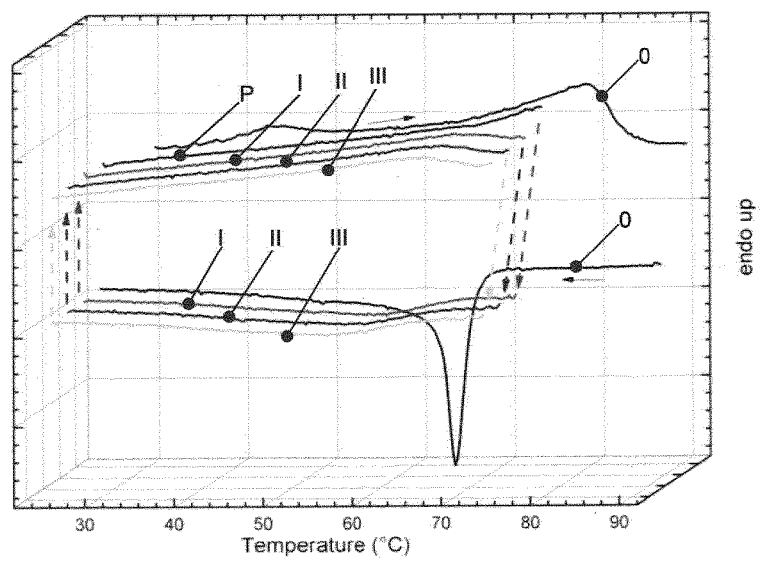
FIG. 8 DSC investigation of cPEVA following the temperature profiles of programming and three subsequent reversibility cycles. Line 0: initial heating and cooling, line P: programming, line I: first cycle, line II: second cycle, line III: third cycle. $T_{reset}$=90° C., $T_{high}$=75° C., $T_{low}$=25° C.

The results of cyclic DSC measurements of cPEVA are shown in FIG. 8. In the first DSC heating the broad melting temperature range $T_m$ can be seen in the heating direction and a sharp crystallization peak in the cooling direction (plot '0'). The broad melting transition of PE crystallites spanning over a temperature interval from around 25 to 85° C. is due to the comonomer vinyl acetate. This broad $T_m$ related to PE domains can be divided in two temperature intervals. Domains associated to the lower $T_m$-range (from $T_{low}$=25° C. to $T_{high}$=75° C.) corresponding to the $T_{t,AD}$ serve as actuator domains AD providing the shape-shifting actuation. Crystallites of the upper $T_m$-range from $T_{high}$ to $T_{reset}$=90° C. $T_{t,SD}$ are used as crystallisable skeleton domains SD determining the overall appearance. Form stability at $T>T_m$ is ensured by the covalent crosslinks.

Heating only to 75° C. results in a partial melting having a broad crystallization peak with the peak maximum at a lower temperature. In the subsequent reversibility cycles, a melting peak providing a peak maximum, which is significantly lower compared to the peak maximum obtained when the sample was completely molten, can be observed.

A $T_{high}$ of 75° C. in a cPEVA crosslinked by 2.0 wt % dicumyl peroxide provided the optimum ratio between skeleton and actuation forming polymer chains segments. When $T_{high}$ or the crosslinking density by changing the dicumyl peroxide weight ratio was varied, the metamorphic shape-shifting capability got deferred. Taking the integral of the heat flow as a measure for crystallinity, at this temperature around one third of the crystallites are located in the skeleton forming domains and two third are acting as actuators.

The shape-shifting capability of cPEVA is obtained by conformational orientation of the PE chain segments in the actuator domains AD associated to the lower $T_m$ range, which causes reversible length changes of the actuator domain during crystallization and melting guided by the internal skeleton. Therefore the skeleton formed by the crystallites of the upper $T_m$ range must be built during programming in such a way that the PE chains within the actuator domains are oriented in the direction of the targeted macroscopic shape-shift. For this purpose, a macroscopic deformation according to the desired appearance was done at $T_{reset}$ so that the chain segments became oriented. The skeleton was formed by cooling under stress to $T_1$, at which the polymer network chain segments associated to $T_{m,SD}$ and $T_{m,AD}$ crystallize. Shape A was achieved after heating to $T_{high}$. The new appearance was now implemented in the material. Crystallization of the oriented actuator segments by cooling to $T_{low}$ resulted in shape B. Reheating to $T_{high}$ caused melting of the actuator domains and entropy driven recoiling of the chain segments enabling the reversible shape shift to shape A.

Figure 11:
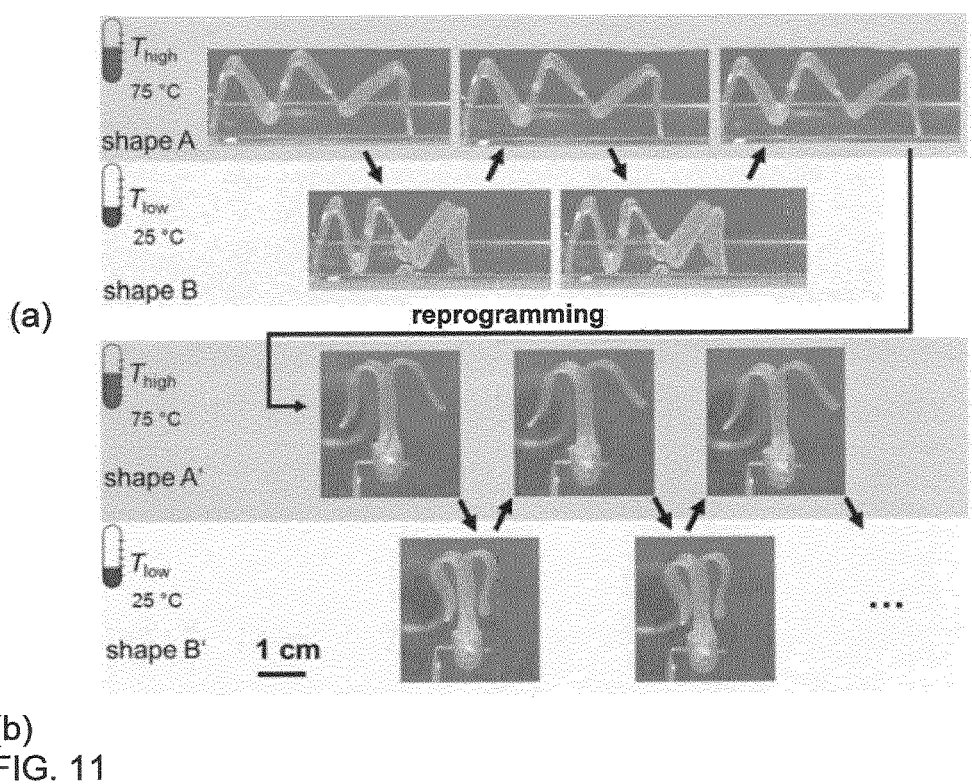
FIG. 11 Photo series illustrating the bSME shape-shifting capability of cPEVA ribbon (80 mm×20 mm×0.9 mm). (a) Programmed caterpillar-like appearance, reversibly shifting between an expanded concertina (shape A) at $T_{high}$ and a contracted concertina (shape B) at $T_{low}$. (b) Reprogrammed butterfly-like appearance reversibly folding between open (shape A') and closed form (shape B').

The reprogrammable shape-shifting capability of cPEVA is illustrated as photo series in FIG. 11. Initially, a cPEVA ribbon is shown in an expanded concertina (shape A), symbolizing a caterpillar, at $T_{high}$=75° C. Cooling to $T_{low}$=25° C. resulted in shape B, which in this case was a contracted concertina. Cyclic heating and cooling between $T_{high}$ and $T_{low}$ reversibly shape-shifted between the expanded and contracted appearance such as in a living caterpillar.

cPEVA displayed a bSME, which was reprogrammable as shown in FIG. 11b. Heating to $T_{reset}$=90° C. erased the internal skeleton and thereby shapes A and B. The new appearance was created by macroscopic deformation according to the desired butterfly geometry. The corresponding internal skeleton was formed by cooling under stress to $T_{low}$. Stretched wings (shape A') were achieved after heating to $T_{high}$. The wings were folded (shape B') when the material was cooled to $T_{low}$. Also, this shape shift was reversible upon cooling and heating between $T_{low}$ and $T_{high}$. The shape shifts occurred at the same temperatures independent from the appearance.

Figure 9:
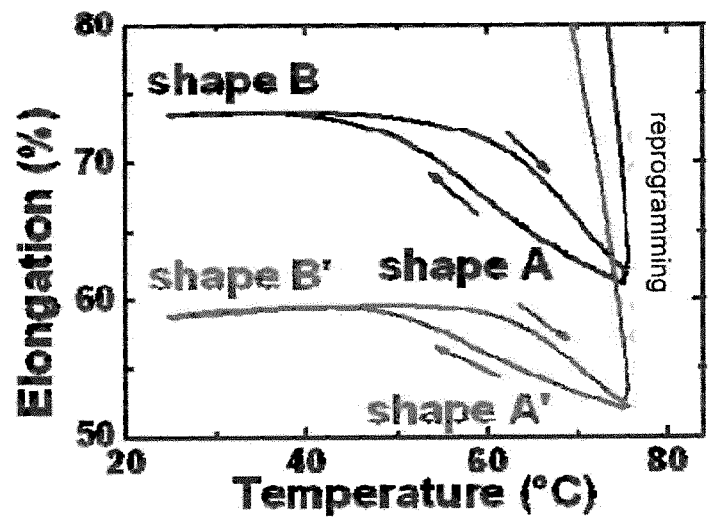
FIG. 9 Quantified cyclic, thermo-mechanical tensile tests regarding the bSME of cPEVA. Parameters: $T_{reset}$=90° C., $T_{high}$=75° C., $T_{low}$=25° C.; $\varepsilon_{prog}$=150% (shape A/B) and $\varepsilon_{prog}$=100% (shape A'/B'). (a): Elongation ε as function of temperature T for the first reversibility cycle. (b): ε and T versus time plot for three reversibility cycles.
Figure 9:
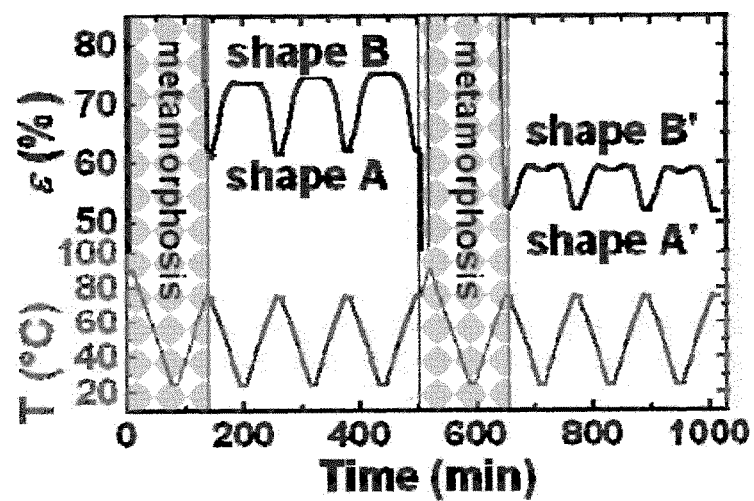

The reversible shape-shifting effect was quantified by cyclic, thermo-mechanical tensile tests. These tests consisted of the formation of an initial skeleton under deformation to $\Sigma_{def}$ and three subsequent reversibility cycles (see methods). The results of these investigations are displayed in FIG. 9 a, b. In FIG. 9a, the elongation c is plotted against temperature T for the first reversibility cycle. Shape A is characterized by $\Sigma_A$ at $T_{high}$ and is stabilized by the internal skeleton SD, which was created by crystallization at $\varepsilon_{def}$=150%. On cooling to $T_{low}$ the polymer shifted to shape B, whereby the increase in elongation to $\varepsilon_B$(~12%) was caused by the crystallization of the oriented actuator PE domains (AD). Heating to $T_{high}$ resulted in shape A again. From FIG. 9a, the shifting temperatures $T_{sw}$(A→B) (59±1° C.) and $T_{sw}$(B→A) (69±1° C.) become apparent. Their difference corresponds to the temperature difference between the crystallisation and melting temperatures of the actuator domains $T_{c,AD}$ (55±3° C.) and $T_{m,AD}$ (68±3° C.) (compare FIG. 8). In the following reversible shape-shifting cycles, the sample shifted reversibly between shapes A and B within the margin of error (FIG. 9b). When a new appearance was created by heating to $T_{high}$ and crystallization at $\varepsilon_{def}$=100%, reversible shape shifts between shapes A' and B' were obtained, whereby the increase in elongation to $\varepsilon_{B'}$ was now ~7% while the shifting temperatures did not change. The high reversibility of the bSME is remarkable for a material system based on a commodity plastic.

Figure 10:
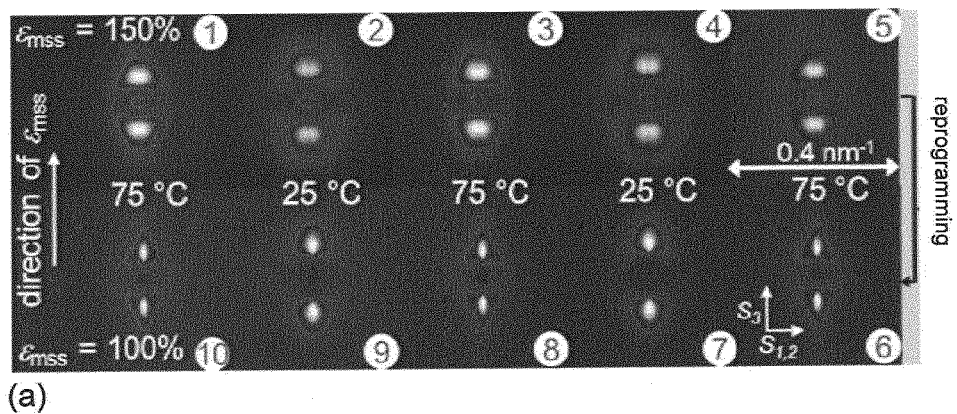
FIG. 10 (a): Structural changes occurring during bSME of cPEVA determined by 2D Small Angle X-ray Scattering (SAXS) recorded for shape A and B and, after reprogramming, for shape A' and B' in subsequent reversibility cycles between ($T_{high}$=75° C., $T_{low}$=25° C., upper series $\varepsilon_{prog}$=150%, lower series $\varepsilon_{prog}$=100%). Numbers indicate steps during experiment. (b): Changes of longperiods schematically shown for cPEVA during reversible shape shifts.
Figure 10:
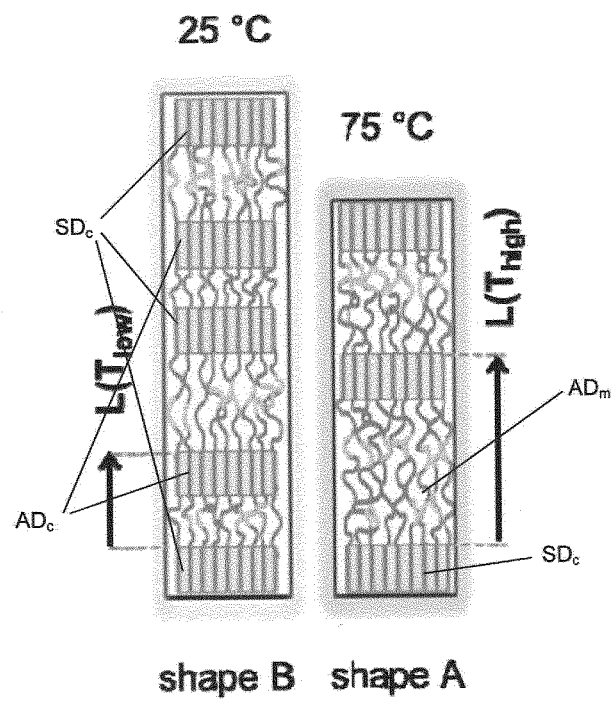

In situ small angle x-ray scattering (SAXS) measurements were performed to explore structural changes during the shape-shifting effect on the nanoscale for cPEVA. Similar scattering patterns were found for shape A at $T_{high}$ and for shape B at $T_{low}$ during several cycles confirming excellent reversibility of the shape shift on this hierarchical level (FIG. 10a). At $T_{high}$ the achieved anisotropic scattering pattern can be attributed solely to the crystalline, skeleton PE domains $SD_c$. These consist of crystalline and amorphous lamella oriented orthogonally to the direction of the extension applied during programming (FIG. 10b). The macroscopic change in sample length during the actuation should be reflected on the nanoscale by changes of the longperiods, which is the average distance between two crystalline lamellae consisting of a crystalline and an amorphous part. As long as the sample's macroscopic dimensions do not change, a doubling of the crystallinity should result in a reduction of the longperiod by 50% anticipating constant lamellar thickness at both temperatures. Accordingly, an increase of crystallinity of 50% by formation of additional crystalline lamellae in a part of the amorphous region (in-between the existing skeleton) would result in a decrease of the longperiod by one third. If the macroscopic sample changes its length because of actuation this has to be considered on the nanoscale of longperiods to the same extent. Applying this model on the cPEVA system for which an increase of crystallinity of 60% and a macroscopic length change of 12% were obtained during cooling from 75 to 25° C., a longperiod of 10.7 nm could be calculated for shape B starting from a longperiod $L(T_{high})$ of 15.4 nm for shape A. This estimate corresponds within the experimental margin of error to the experimentally determined longperiod $L(T_{low})$ of 11.4 nm for shape B. A macroscopic length change of 7% was determined for the same cPEVA ribbon, which was now metamorphed with $\varepsilon_{def}$=100%. This macroscopic effect again correlates well with the changes of the experimentally determined longperiods $L(T_{high})$ of 16.1 nm for shape A' and a longperiod $L(T_{low})$ of 13.1 nm for shape B'.

A similar heat engine as described for the PPDL-PCL polymer system was successfully constructed using two cPEVA actuation elements (data not shown).

EXAMPLE 3 cPEVA-monofilament Fibers

A mixture of Poly(ethylene-co-vinyl acetate) (PEVA), triallyl isocyanurate (TIAC) as cross-linking agent and benzophenone as photoinitiator were fed to an extruder and formed to a filament. The filament was UV irradiated to yield covalently cross-linked fibers cPEVA. The UV irradiation was integrated in the extrusion process. The cPEVA monofilaments had initially a diameter of 0.4-0.5 mm. After a thermal treatment at 100° C. the diameter increased to 0.8-0.9 mm.

Figure 12:
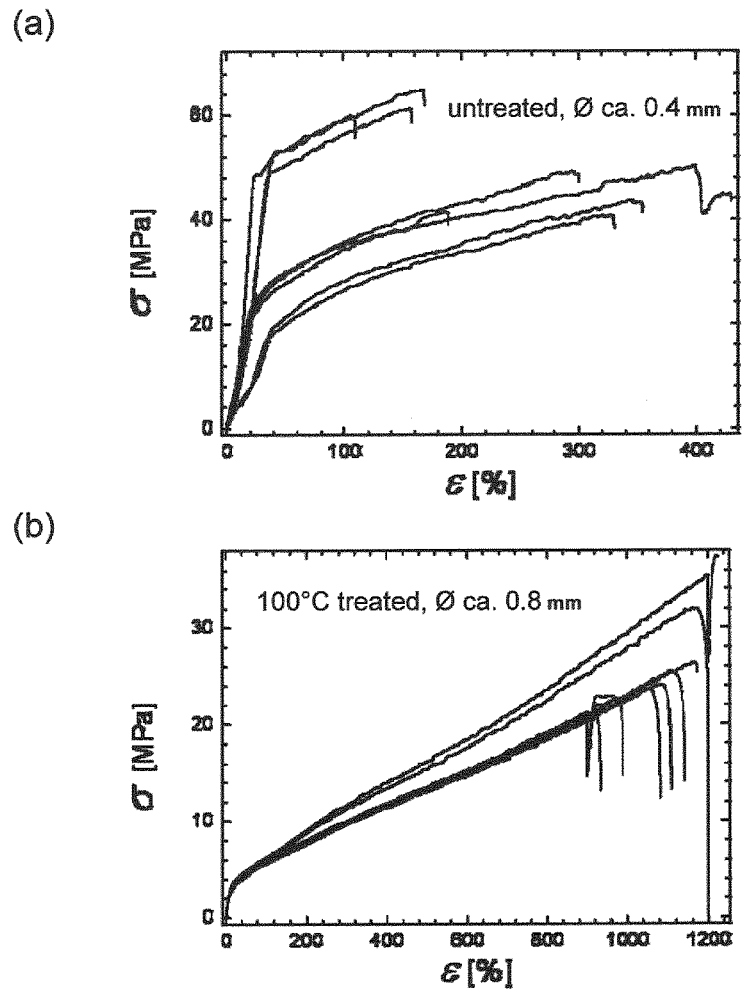
FIG. 12 Mechanical properties of cPEVA monofilaments: stress σ versus elongation ε plots measured at room temperature for the filaments as produced (a) and after a heat treatment (shrinking) at 100° C. (b).

The mechanical properties of the cPEVA monofilaments produced in this manner (before and after thermal treatment) were examined in tensile tests at room temperature. The untreated monofilaments exhibited stresses at failure in a range from 60 to 80 MPa and percent elongations at failure in a range from 100 to 400%, whereas the thermally treated monofilaments exhibited stresses at failure in a range from 20 to 30 MPa and percent elongations at failure of >800% (see FIG. 12).

Figure 13:
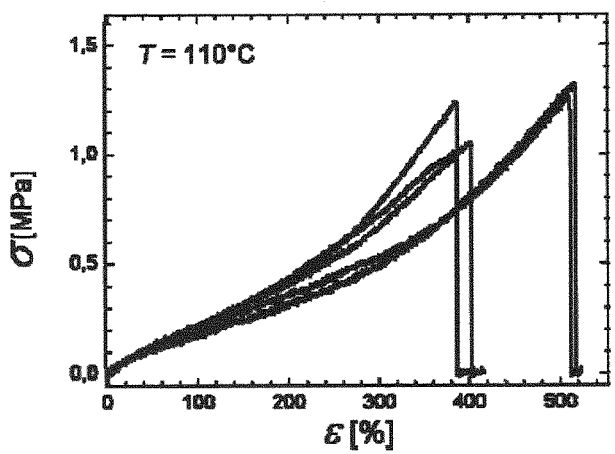
FIG. 13 Mechanical properties of cPEVA monofilaments: stress σ versus elongation ε plots measured at 110° C.

Further tensile tests were performed in the rubber-elastic state at a temperature of 110° C., which is above the melting point of the polyethylene crystallites in cPEVA. Moreover, these tests show the successful covalent cross-linking of the monofilaments. At 110° C., the thermally pretreated monofilaments exhibited stresses at failure in a range from 1.0 to 1.3 MPa and percent elongations at failure of >350% (see FIG. 13).

Figure 14:
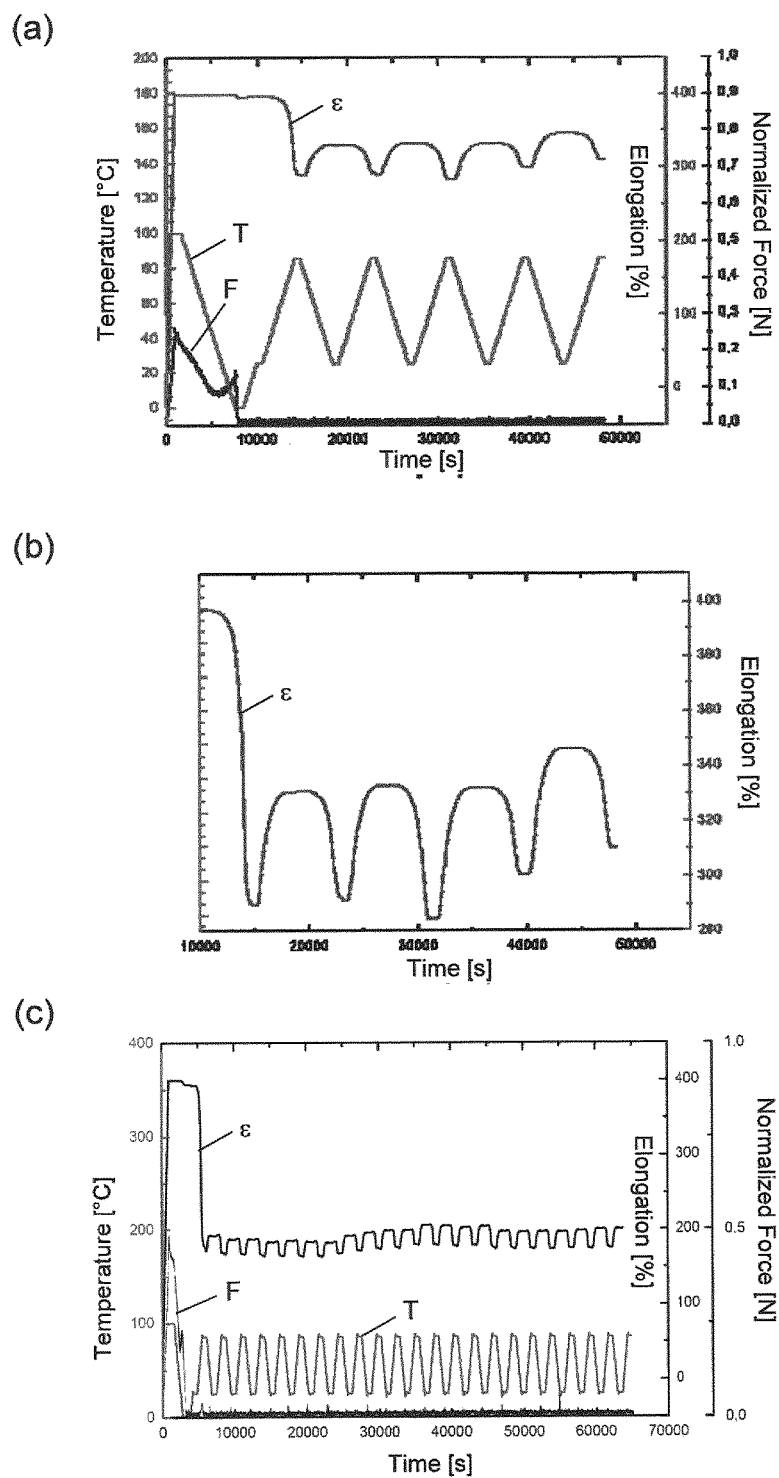
FIG. 14 Mechanical properties of cPEVA monofilaments during programming and bidirectional shape shift: temperature T/normalized Force F/elongation ε versus time plot, (a) four cycles, (b) elongation over four cycles and (c) 21 cycles.

Thermally pretreated cPEVA monofilaments were used for the bSME functionalization. The thermally pretreated monofilaments were first stretched at 100° C. ($T_{reset}$) to a length of 400% and then cooled down to 0° C. while maintaining the applied stress, wherein the skeleton structure is formed. After switching over to the force-free state, the material was heated to a temperature $T_{high}$=85° C., wherein shape A (an elongation of ca. 300% in this case) was obtained. When the material was cooled down to a temperature $T_{low}$=25° C., it expanded to a length of ca. 330% (shape B). It was possible to reversibly switch between shape A and shape B by repeatedly cyclically heating the material up to $T_{high}$ and cooling it down to $T_{low}$ (see FIGS. 14a and 14b (4 cycles each) and FIG. 14c (21 cycles)).

Figure 15:
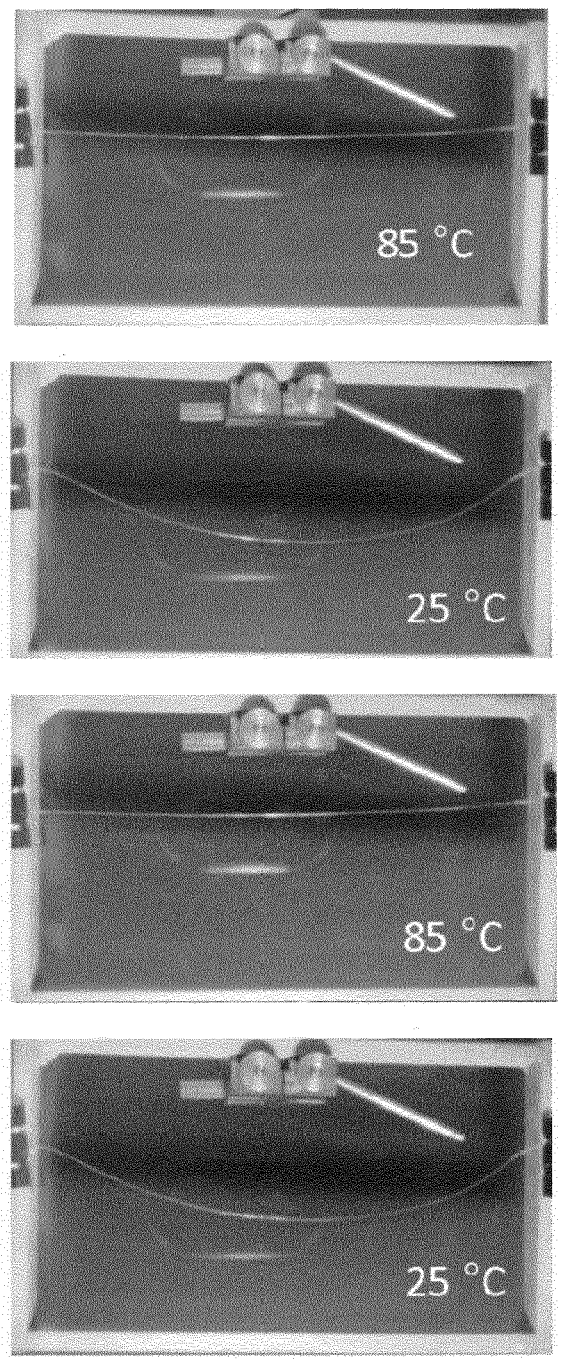
FIG. 15 Photo series showing the reversible bSME of a cPEVA monofilament.

In addition, a demonstration experiment was performed. In this experiment a filament of cPEVA programmed in the way as described above was horizontally fixed with both ends in a chamber equipped with a temperature control. Then the temperature in chamber was controlled to vary between $T_{low}$=25° C. and $T_{high}$=85° C. FIG. 15 shows a photo series of two cycles. It can be seen that the cPEVA fiber reversibly deflects at 25° C. and contracts at 85° C.

EXAMPLE 4 bSME Comprising a Micro-textured Surface Structure

Figure 16:
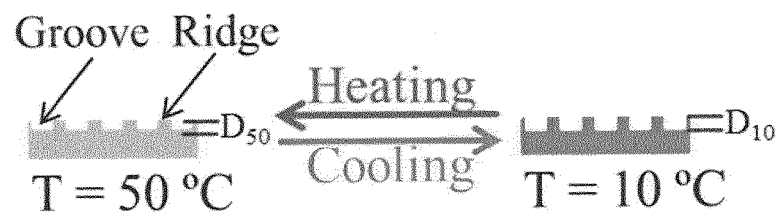
FIG. 16 bSMP comprising a micro-structured surface texture and its bidirectional shape-memory effect.

A film was manufactured from the covalently cross-linked PPDL-PCL material as used in Example 1. The film was heated to 90° C. ($T_{reset}$) and a structured template having a regular pattern of parallel linear grooves was pressed onto the surface of the film to a predetermined depth. While maintaining the template and the force on the film, the film was cooled to 10° C. ($T_{low}$) and the template was removed. After heating to 50° C. the resulting shape A was a film having a regular pattern of grooves with a depth $D_{50}$ at 50° C. of about 40 nm (FIG. 16, left side).

Figure 17:
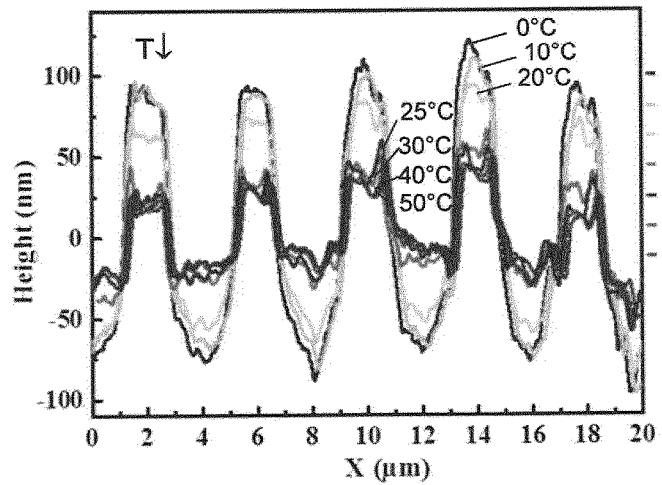
FIG. 17 Cross section profile of a micro-structured bSMP obtained from AFM images during cooling (a) and heating (b).
Figure 17:
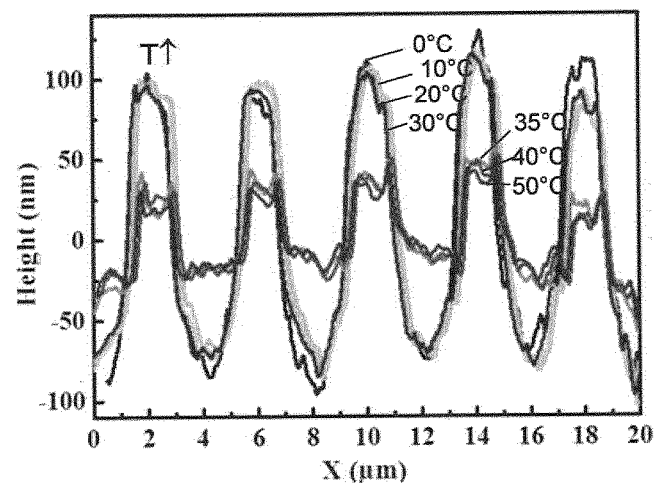
Figure 18:
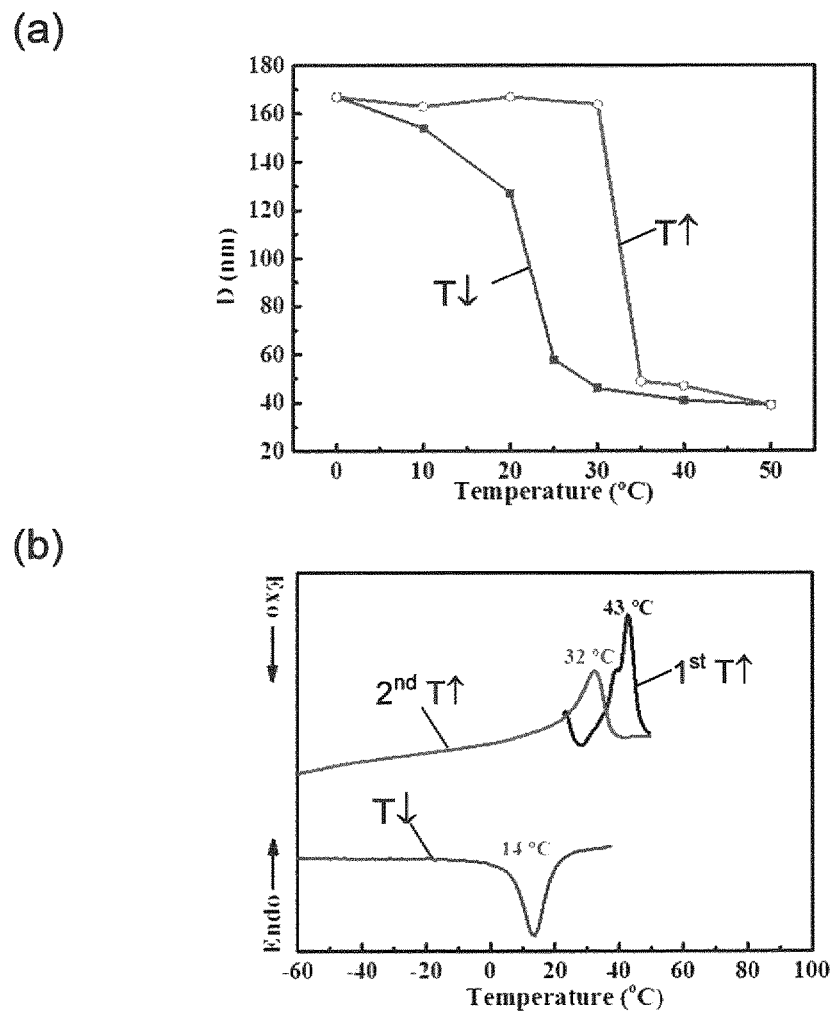
FIG. 18 Groove depth D versus temperature of the micro-structured bSMP obtained during heating and cooling (a) and DSC plots during the first heating, cooling and second heating (b).

Subsequently, the temperature was varied stepwise between $T_{high}$=50° C. and $T_{low}$=0° C. Upon cooling the depth of the grooves increased as shown on the right side of FIG. 16. The cross section of the profile was measured with AFM. FIG. 17 depicts the cross section profiles as determined from the AFM images for various temperatures during the cooling (a) and heating (b) of the textured film. It can be seen that upon cooling the shape shift (expansion) occurred between 25 and 20° C., whereas the contraction during heating was observed between 30 and 35° C. (see also FIG. 18a showing the groove depth as a function of temperature during heating and cooling). These switching temperatures are consistent with the melting of PCL crystals ($T_{m,PCL}$=32° C.) and the crystallization of PCL ($T_{c,PCL}$=14° C.) as obtained from DSC results shown in FIG. 18b.

EXAMPLES 5-7

Various Cross-linked Single Thermoplastics

General preparation: The single polymer and dicumyl peroxide (Sigma-Aldrich) were mixed in a twin-screw extruder (EuroPrismLab, Thermo Fisher Scientific) at 110° C. and 50 rpm. The mixtures were compression molded into films with 1 mm thickness and subsequently crosslinked at 200° C. and 20 bar for 25 min.

The following single polymers were used:

Example 5 cPEVA systems

Various cPEVAs were prepared from poly[ethylene-co-(vinyl acetate)] with a VA-content of 9 wt % (Greenflex ML30), 18 wt % (ELVAX460, cPEVA20), 28 wt % (ELVAX3175, cPEVA31), 35 wt % (ELVAX150, all from DuPont, cPEVA35) via thermally crosslinking with dicumyl peroxide.

Example 6 cPEAEMA systems

Lotader® 5500 (PEAEMA) is a random terpolymer of ethylene 77.2 wt %, acrylic ester 20 wt % and maleic anhydride 2.8 wt %, which was thermally crosslinked with dicumyl peroxide.

Example 7 cPEMAGMA systems

Lotader® AX8900 (PEMAGMA) is also a terpolymer of polyethylene with less percentage of PE around 68 wt %, methyl acrylate content is 24 wt %, which was thermally crosslinked with dicumyl peroxide. Here the reactive group is glycidyl methacrylate (GMA) which is 8 wt %

EXAMPLES 8-11

Various Cross-linked Blends of Two Thermoplastics

General preparation: Polymer mixtures and cross-linking agent (dicumyl peroxide or ,5-Bis(tert-butylperoxy)-2,5-dimethylhexane) were mixed in a twin-screw extruder (EuroPrismLab, Thermo Fisher Scientific). The blends were compression molded into films with 1 mm thickness and subsequently crosslinked at 200° C. and 20 bar for 25 min.

The following polymer were used:

Example 8 cHDPE-EOC blend systems

HDPE, poly(ethylene-co-1-octene) (with 30 branches per 1000 C units) Affinity PL1280G (Dow Chemical), and the cross-linking agent 2,5-Bis(tert-butylperoxy)-2,5-dimethylhexane (DHBP, Luperox101) (Sigma-Aldrich, Germany) were used as received. After drying for 4 hours at 60° C. under vacuum, a blend of 15 wt % HDPE and 85 wt % EOC was extruded in a twin-screw extruder (EuroPrismLab, Thermo Fisher Scientific, USA) at 130° C. at a rotating speed of 150 rpm. The extrusion was performed twice to ensure a homogeneous blend. DHBP was added in the presence of ethanol to facilitate diffusion at 0.5, 1, and 2 wt % of the blend, the covered beakers were stored for 3 days to complete the diffusion. The blends were compression molded as follows: Heating to 130° C. without pressure for 5 min, applying 100 bar for 5 min, performing the cross-linking reaction at 200° C. and 100 bar for 20 min and finally cooling to 30° C. at 100 bar to obtain 0.5 mm thick films.

Example 9 cPEVA/PCL systems poly[ethylene-co-(vinyl acetate)] with a VA-content 18 wt % (ELVAX460, cPEVA20) and poly (ε-capro(actone) PCL, (CAPA 6800) and dicumyl peroxide as cross-linking agent was utilized.

Example 10 cPEAEMA/PCL systems

Lotader® 5500 (PEAEMA) with a ethylene content of 77.2 wt %, acrylic ester: 20 wt % and maleic anhydride: 2.8 wt % and poly (ε-caprolactone) PCL, (CAPA 6800) and dicumyl peroxide as cross-linking agent was utilized.

Example 11 cPEMAGMA/PCL systems

Lotader® AX8900 (PEMAGMA) with a PE content around 68 wt %, methyl acrylate content is 24 wt % and glycidyl methacrylate (GMA) 8 wt % and poly (ε-caprolactone) PCL, (CAPA 6800) and dicumyl peroxide as cross-linking agent was utilized.

EXAMPLES 12-14

Multiphase Polymer Networks Prepared Via Polymerization from Oligomeric or Monomer Compound Example 12: cPCL-PCHMA systems:

PCL dimethacrylates of 4 kDa (CAPA®2402, Solvay, Warringthon, UK), 8 kDa (CAPA®2803, Solvay, Warringthon, UK), and 10 kDa (Sigma-Aldrich. Germany) were mixed in wt % ratios 1:1:1 with butyl acrylate (Sigma-Aldrich, Germany) at 15 wt % and 25 wt % at 80° C. under stirring. The crosslinking reaction was performed after pouring the mixture between glass plates (1 mm PTFE spacer) and irradiating for 60 min with a UV-D106 unit (Esacure, Lamberti).

Example 13: cPPDL-PCL

The PPDL-PCL was prepared from a star shaped PPDL-triol and a star shaped PCL-tetraol initiator with a mixture of the two isomers 1,6-diisocyanato-2,2,4-trimethylhexane and 1,6-diisocyanato-2,4,4-trimethylhexane.

Example 14: cPCLBA:

cPCLBA was synthesized by thermally induced copolymerization of poly(ε-caprolactone)diisocyantoethyl dimethacrylate (38.8 wt %) with 60.4 wt % n-butyl acrylate (Sigma-Aldrich) and 0.8 wt % 2,2'-azoisobutyronitrile at 80° C. for 72 hours. Poly(ε-caprolactone) diisocyantoethyl dimethacrylate was obtained from the reaction of poly(ε-caprolactone) (Mn 8,300 g·mol-1) with 2-isocyantoethyl methacrylate. cPCLBA provided a $T_{g,mix}$ at −63° C. and a $\Delta T_m$, which ranged from 5 to 60° C. with the peak at 50° C.

EXAMPLE 15

Magneto-Sensitive Multiphase Polymer Networks Composites

General Procedure: The composites were prepared via polymerization from oligomeric or monomeric compounds and magnetic nanoparticles (MNP) or polyhydroxy functionalized polymer modified MNPs (OCLMNP1, OCLMNP2, OPDLMNP1, OPDLMNP2).

cPPDL-PCL composites with different MNP

PPDL PCL composites were prepared by crosslinking star shaped PPDL and PCL precursors by using HDI as coupe agent, the products are named (4PPDL3PCL(15, 85), 4PPDL3PCL(20,80) 4PPDL3PCL(25,75), 4PPDL3PCL(15,85) OCLMNP1, 4PPDL3PCL(20,80) OCLMNP1 4PPDL3PCL(25,75) OCLMNP1. 4PPDL3PCL(15,85) OCLMNP2, 4PPDL3PCL(20,80) OCLMNP2, 4PPDL3PCL(25,75) OCLMNP2. 4PPDL3PCL(15,85) OPDLMNP1, 4PPDL3PCL(20, 80) OPDLMNP1, 4PPDL3PCL(25,75) OPDLMNP1, 4PPDL3PCL(15,85) OPDLMNP2, 4PPDL3PCL(20, 80) OPDLMNP2, 4PPDL3PCL(25,75) OPDLMNP2). The star-shaped precursors were synthesized from the cyclic monomers in bulk under a nitrogen atmosphere at 130° C., catalyzed by DBTO, and purified by precipitation of a dichloromethane solution in cold hexane. The synthesis of the polymer networks was performed in dichloroethane solution under a nitrogen atmosphere by reacting the star-shaped hydroxy-telechelic precursors with HDI using DBTDL as catalyst.

Gel contents of these composites were determined to be in the range from 88 to 97%. The content of the MNP in the material was 4±1%.

The thermal and mechanical properties of the bSMP materials according to examples 5 to 15 were examined by DSC. The results are shown in Tables 1 to 4. Results of the bSME performances of the materials are shown in Tables 5 to 8.

TABLE 1

Mechanical and thermal properties

| Material | ID | E-Modul (MPa) $T_{high} > T_m$ | $\varepsilon_b$ (%) $T_{high} > T_m$ | $T_m$ (° C.) | $\Delta T_m$ (° C.) | $\Delta H_m$ (J·g$^{-1}$) |
|---|---|---|---|---|---|---|
| EVA9 2 wt % DCP | cPEVA10d20 | 1.1 ± 0.1 | 432 ± 97 | 91 | 70 | 77 |
| ELVAX460 5 wt % DCP | cPEVA20d50 | 2.6 ± 0.1 | 107 ± 24 | 73 | 75 | 58 |
| ELVAX460 2 wt % DCP | cPEVA20d20 | 1.2 ± 0.1 | 190 ± 50 | 81 | 90 | 70 |

TABLE 1-continued

Mechanical and thermal properties

| Material | ID | E-Modul (MPa) $T_{high} > T_m$ | $\varepsilon_b$ (%) $T_{high} > T_m$ | $T_m$ (° C.) | $\Delta T_m$ (° C.) | $\Delta H_m$ (J·g$^{-1}$) |
|---|---|---|---|---|---|---|
| ELVAX460 1 wt % DCP | cPEVA20d10 | 0.7 ± 0.1 | 380 ± 90 | 83 | 90 | 67 |
| ELVAX460 0.5 wt % DCP | cPEVA20d05 | 0.5 ± 0.1 | 740 ± 100 | 84 | 90 | 68 |
| EVAX3175 2 wt % DCP | cPEVA31d20 | 1.5 ± 0.1 | 200 ± 50 | 65 | 80 | 41 |
| EVAX150 2 wt % DCP | cPEVA35d20 | n.d. | ~50 | 56 | 70 | 33 |
| HDPE(15%)EOC(85%) 2 wt % DHBP | cHE20 | 0.8 ± 0.1 | 1120 ± 20 | 88 and 115 | 70 | 90 |
| HDPE(15%)EOC(85%) 1 wt % DHBP | cHE10 | 0.4 ± 0.2 | 950 ± 300 | 88 and 118 | 70 | 93 |
| HDPE(15%)EOC(85%) 0.5 wt % DHBP | cHE05 | 0.2 ± 0.2 | 360 ± 10 | 90 and 121 | 70 | 111 |
| PCL(85%)PCHMA(15%) | PCHMA15 | 3.8 | 150 ± 30 | 39 | 40 | 36 |
| PCL(75%)PCHMA(25%) | PCHMA25 | ~3 | 150 ± 30 | 37 | 40 | 22 |
| PPDL-PCL(10,75) | PPD-PCL | 4.6 ± 0.2 | 47 ± 7 | 35 and 65 | 30 and 20 | 42 and 17 |
| PCL-Butylacrylate | cPnBA | | | 50 | 55 | |

TABLE 2

Mechanical and thermal properties of cross-linked polymers

| Composition I.D | $T_c$ [° C.] | $T_{m,PE}$ [° C.] | $T_{m,PCL}$ [° C.] | $\Delta H_m$ [J/g] | $\Delta H_c$ [J/g] | $T_g$ [° C.] | $T_{g,PE}$ [° C.] | $T_{g,max}$ [° C.] | $X_{c,PE}$ [%] | $X_{c,PCL}$ [%] | E [MPa] | $F_{max}$ [N] | $\varepsilon_b$ [%] |
|---|---|---|---|---|---|---|---|---|---|---|---|---|---|
| cPEVA18D10 | 62 ± 1 | 83 ± 1 | — | 66 | −77 | −32 | — | −4.7 ± 1 | 23 | — | 29 ± 2.5 | 36 ± 1.5 | 600 ± 50 |
| cPEVA18D15 | 61 ± 1 | 82 ± 1 | — | 64 | −75 | −31 | — | −4.5 ± 1 | 22 | — | 34 ± 1.8 | 37 ± 2 | 570 ± 38 |
| cPEVA18D20 | 60 ± 1 | 81 ± 1 | — | 62 | −65 | −30 | — | −4 ± 1 | 21 | — | 39 ± 1.5 | 50 ± 0.5 | 530 ± 15 |
| cPEMAGMA24D10 | 39 ± 1 | 60 ± 1 | — | 38 | −42 | −34 | — | −16 ± 1 | 13 | — | 4.5 ± 0.3 | 20 ± 0.7 | 1060 ± 45 |
| cPEMAGMA24D15 | 38 ± 1 | 59 ± 1 | — | 35 | −49 | −34 | −121 | −15 ± 1 | 12 | — | 5.5 ± 0.7 | 25 ± 0.6 | 990 ± 40 |
| cPEMAGMA24D20 | 36 ± 1 | 58 ± 1 | — | 33 | −42 | −33 | −113 | −14 ± 1 | 11 | — | 6.5 ± 0.5 | 30 ± 0.25 | 910 ± 15 |
| PEMAGMA24D00 | 43 ± 1 | 63 ± 1 | — | 40 | −43 | −32 | — | −17 ± 1 | 14 | — | 4.2 ± 0.25 | 22 ± 0.8 | 960 ± 50 |
| cPEAEMA20D10 | 56 ± 1 | 74 ± 1 | — | 47 | −58 | −39 | — | −18 ± 1 | 16.3 | — | 13 ± 0.86 | 25 ± 1.5 | 1020 ± 40 |
| cPEAEMA20D15 | 54 ± 1 | 73 ± 1 | — | 45 | −60 | −38 | — | −16 ± 1 | 15.6 | — | 13.5 ± 0.5 | 26 ± 3 | 990 ± 65 |
| cPEAEMA20D20 | 53 ± 1 | 72 ± 1 | — | 44 | −53 | −37 | — | −11 ± 1 | 15.4 | — | 14 ± 0.65 | 31 ± 2.5 | 900 ± 22 |
| PEAEMA20D00 | 58 ± 1 | 77 ± 1 | — | 49 | −55 | −34 | — | −15 ± 1 | 17 | — | 12 ± 1.1 | 18 ± 0.5 | 1010 ± 50 |

TABLE 3

Formulation of blends with different cross-linker concentration

| Polymers | DCP [%] | Polymer [%] | PCL [%] | Composition I.D |
|---|---|---|---|---|
| PEVA-PCL | 2 | 75 | 25 | cPEVA75PCL25 |
| PEVA-PCL | 2 | 50 | 50 | cPEVA50PCL50 |
| PEVA-PCL | 2 | 25 | 75 | cPEVA25PCL75 |
| PEMAGMA-PCL | 2 | 75 | 25 | cPEMAGMA75PCL25 |
| PEMAGMA-PCL | 2 | 50 | 50 | cPEMAGMA50PCL50 |
| PEMAGMA-PCL | 2 | 25 | 75 | cPEMAGMA25PCL75 |
| PEAEMA-PCL | 2 | 75 | 25 | cPEAEMA75PCL25 |
| PEAEMA-PCL | 2 | 50 | 50 | cPEAEMA50PCL50 |
| PEAEMA-PCL | 2 | 25 | 75 | cPEAEMA25PCL75 |

TABLE 4

Mechanical and thermal properties of polymer blends

| Composition I.D | $T_c$ [° C.] | $T_c$ [° C.] | $T_c$ [° C.] | $T_{m,PE}$ [° C.] | $T_{m,PCL}$ [° C.] | $\Delta H_m$ [J/g] | $\Delta H_c$ [J/g] | $T_g$ [° C.] | $T_{g,P.E}$ [° C.] |
|---|---|---|---|---|---|---|---|---|---|
| cPEVA75PCL25 | 59 ± 1 | −1 | — | 82 ± 1 | 53 | 60 | −84 | −66 | −130 |
| cPEVA50PCL50 | 61 ± 1 | 19 | — | 81 ± 1 | 54 ± 1 | 62 | −62 | −63 | — |
| cPEVA25PCL75 | 61 ± 1 | 19 | — | 81 ± 1 | 55 ± 1 | 73 | −65 | −64 | −135 |
| cPEMAGMA75PCL25 | 37 ± 1 | −11 | — | 54 ± 1 | — | 40 | −67 | −34 | — |
| cPEMAGMA50PCL50 | 37 ± 1 | 18 | −7 | 53 ± 1 | — | 46 | −54 | −63 | — |
| cPEMAGMA25PCL75 | 38 ± 1 | 16 | — | 54 ± 1 | — | 58 | −57 | −63 | — |
| cPEAEMA75PCL25 | 53 ± 1 | −11 | — | 73 ± 1 | 55 ± 1 | 52 | −72 | −32 | −128 |
| cPEAEMA50PCL50 | 54 ± 1 | 9 | −5 | 74 ± 1 | 54 ± 1 | 56 | −57 | −62 | — |
| cPEAEMA25PCL75 | 54 ± 1 | 19 | — | 74 ± 1 | 55 ± 1 | 64 | −60 | −64 | −130 |

TABLE 4-continued

Mechanical and thermal properties of polymer blends

| Composition I.D | $T_{g,max}$ [° C.] | $X_{c,P.E}$ [%] | $X_{c,PCL}$ [%] | E [MPa] | $F_{max}$ [N] | $\varepsilon_b$ [%] |
|---|---|---|---|---|---|---|
| cPEVA75PCL25 | −2 ± 1 | 16 | 18 | 85 ± 3 | 46 ± 1.4 | 590 ± 40 |
| cPEVA50PCL50 | −10 ± 1 | 11 | 38 | 110 ± 2.5 | 50 ± 0.5 | 390 ± 20 |
| cPEVA25PCL75 | −13 ± 1 | 6 | 67 | 137 ± 2 | 71 ± 2.5 | 680 ± 10 |
| cPEMAGMA75PCL25 | −15 ± 1 | 11 | 12 | 37 ± 3.5 | 27 ± 1 | 850 ± 35 |
| cPEMAGMA50PCL50 | −19 ± 1 | 8 | 28 | 52 ± 5 | 40 ± 1.5 | 830 ± 18 |
| cPEMAGMA25PCL75 | −21 ± 1 | 5 | 53 | 98 ± 4.5 | 62 ± 2 | 750 ± 40 |
| cPEAEMA75PCL25 | −7 ± 1 | 14 | 16 | 46 ± 2 | 26 ± 1 | 810 ± 50 |
| cPEAEMA50PCL50 | −13 ± 1 | 10 | 34 | 60 ± 15 | 32 ± 7.5 | 691 ± 88 |
| cPEAEMA25PCL75 | −21 ± 1 | 6 | 59 | 105 ± 3 | 64 ± 6.5 | 770 ± 17 |

TABLE 5 bSME Properties

| Material | ID | $\varepsilon_m$ (%) | $T_{sep}$ ($T_{high}$) (° C.) | $\varepsilon_{rev}$ (%) | $T_{act}$ (A→B) (° C.) | $T_{act}$ (B→A) (° C.) | $Q_{eff}$ (%) |
|---|---|---|---|---|---|---|---|
| EVA9 2 wt % DCP | cPEVA10d20 | 250 | 85 | 7.6 | 76 | 81 | 64.9 |
| ELVAX460 5 wt % DCP | cPEVA20d50 | 75 | 70 | 7.8 | | | 52.4 |
| ELVAX460 2 wt % DCP | cPEVA20d20 | 150 | 75 | 7.8 | 59 | 69 | 45.5 |
| ELVAX460 1 wt % DCP | cPEVA20d10 | 300 | 75 | 5.4 | | | 23.0 |
| ELVAX460 0.5 wt % DCP | cPEVA20d05 | 300 | 80 | 4.4 | | | 50.0 |
| EVAX3175 2 wt % DCP | cPEVA31d20 | 150 | 60 | 11.7 | | | 37.3 |
| EVAX150 2 wt % DCP | cPEVA35d20 | 50 | 50 | 5.2 | | | 66.8 |
| HDPE(15%)EOC(85%) 2 wt % DHBP | cHE20 | 500 | 100 | 13.8 | | | 58.5 |
| HDPE(15%)EOC(85%) 1 wt % DHBP | cHE10 | 500 | 110 | 6.3 | | | 69.4 |
| HDPE(15%)EOC(85%) 0.5 wt % BPO | cHE05 | 100 | — | n.d.* | | | 103.0 |
| PCL(85%)PCHMA(15%) | PCHMA15 | 100 | 50 | 26*** | | | |
| PCL(75%)PCHMA(25%) | PCHMA25 | 100 | 40 | 2 | | | |
| PPDL-PCL(10,75) | PPD-PCL(75) | 40 | 50 | 16.2 | | | 46 |
| PPDL-PCL(10,85) | PPD-PCL(85) | 40 | 50 | 20.3 | | | 22.8 |
| PCL-Butylacrylate | cPnBA | 150 | 50 | 19.5 | 22.2 | 42.5 | 2.5 |

TABLE 6 bSME Properties of cross-linked polymers

| Composition I.D | $T_{reset}$ [° C.] | $\varepsilon_{init}$ [%] | $T_{low,fix}$ [° C.] | $T_{low}$ [° C.] | $T_{high}$ [° C.] | $\varepsilon_{high}$ [%] | $\varepsilon_{low}$ [%] | $\varepsilon_{high,rec}$ [%] | $T_{sw,act}$ [° C.] | $T_{sw,rec}$ [° C.] | $R_{act}$ [%] | $R_{rev}$ [%] |
|---|---|---|---|---|---|---|---|---|---|---|---|---|
| cPEVA18D10 | 90 | 150 | 0 | 25 | 70 | 134 | 137 | 134 | 49 ± 1 | 67 ± 1 | 2.5 ± 0.2 | 100 ± 2 |
| cPEVA18D15 | 90 | 150 | 0 | 25 | 70 | 133 | 138 | 134 | 54 ± 1 | 66 ± 1 | 4 ± 0.4 | 80 ± 3 |
| cPEVA18D20 | 90 | 150 | 0 | 25 | 70 | 124 | 136 | 124 | 55 ± 1 | 65 ± 1 | 10 ± 0.3 | 100 ± 1 |
| cPEMAGMA24D10 | 85 | 500 | −10 | 10 | 60 | 192 | 196 | 190 | 35 ± 1 | 52 ± 1 | 2 ± 0.1 | 150 ± 10 |
| cPEMAGMA24D15 | 85 | 400 | −10 | 10 | 60 | 185 | 198 | 182 | 35 ± 1 | 52 ± 1 | 7 ± 0.8 | 123 ± 4 |
| cPEMAGMA24D20 | 85 | 200 | −10 | 10 | 60 | 82 | 91 | 80 | 35 ± 1 | 52 ± 1 | 10 ± 1.4 | 124 ± 3 |
| cPEAEMA20D10 | 90 | 400 | −10 | 25 | 70 | 327 | 339 | 326 | 45 ± 1 | 63 ± 1 | 4 ± 0.5 | 108 ± 3 |
| cPEAEMA20D15 | 90 | 400 | −10 | 25 | 70 | 282 | 320 | 280 | 45 ± 1 | 63 ± 1 | 9 ± 1.2 | 105 ± 2 |
| cPEAEMA20D20 | 90 | 400 | −10 | 25 | 70 | 256 | 302 | 255 | 45 ± 1 | 63 ± 1 | 17 ± 1.8 | 102 ± 3 |

TABLE 7 bSME Properties of blends

| Composition I.D | $T_{reset}$ [° C.] | $\varepsilon_{init}$ [%] | $T_{low,fix}$ [° C.] | $T_{low}$ [° C.] | $T_{high}$ [° C.] | $\varepsilon_{high}$ [%] | $\varepsilon_{low}$ [%] | $\varepsilon_{high,rec}$ [%] | $T_{sw,act}$ [° C.] | $T_{sw,re}$ [° C.] | $R_{act}$ [%] | $R_{rev}$ [%] |
|---|---|---|---|---|---|---|---|---|---|---|---|---|
| cPEVA75PCL25 | 90 | 400 | −10 | 25 | 70 | 194 | 231 | 191 | 46 ± 1 | 58 ± 1 | 19 ± 0.3 | 108 ± 2 |
| c(PEVA/PCL) | 90 | 250 | −10 | 25 | 60 | 142 | 168 | 145 | 45 ± 1 | 59 ± 1 | 18 ± 0.5 | 85 ± 3 |
| c(PEVA/PCL) | 90 | 250 | −10 | 25 | 70 | 104 | 119 | 102 | 43 ± 1 | 59 ± 1 | 14 ± 0.5 | 112 ± 5 |
| cPEVA25PCL75 | 90 | 400 | 0 | 10 | 60 | 211 | 240 | 212 | 49 ± 1 | 58 ± 1 | 14 ± 1 | 97 ± 1 |
| cPEMAGMA75PCL25 | 90 | 400 | −10 | 25 | 60 | 128 | 142 | 122 | 42 ± 1 | 58 ± 1 | 11 ± 1 | 143 ± 4 |
| c(PEMAGMA/PCL) | 90 | 400 | −10 | 25 | 70 | 35 | 39 | 32 | 39 ± 1 | 59 ± 1 | 12 ± 1.5 | 172 ± 5 |
| c(PEMAGMA/PCL) | 90 | 400 | −10 | 25 | 60 | 93 | 107 | 89 | 41 ± 1 | 58 ± 1 | 15 ± 1.2 | 125 ± 4 |
| cPEMAGMA25PCL75 | 90 | 400 | 0 | 10 | 60 | 80 | 97 | 78 | 45 ± 1 | 60 ± 1 | 24 ± 2 | 112 ± 3 |

TABLE 7-continued bSME Properties of blends

| Composition I.D | $T_{reset}$ [° C.] | $\varepsilon_{init}$ [%] | $T_{low,fix}$ [° C.] | $T_{low}$ [° C.] | $T_{high}$ [° C.] | $\varepsilon_{high}$ [%] | $\varepsilon_{low}$ [%] | $\varepsilon_{high,rec}$ [%] | $T_{sw,act}$ [° C.] | $T_{sw,re}$ [° C.] | $R_{act}$ [%] | $R_{rev}$ [%] |
|---|---|---|---|---|---|---|---|---|---|---|---|---|
| cPEAEMA75PCL25 | 90 | 400 | −15 | 25 | 70 | 252 | 261 | 247 | 49 ± 1 | 61 ± 1 | 4 ± 1 | 155 ± 6 |
| c(PEAEMA/PCL) | 90 | 400 | −10 | 25 | 70 | 135 | 151 | 131 | 42 ± 1 | 58 ± 1 | 12 ± 0.5 | 128 ± 4 |
| c(PEAEMA/PCL) | 90 | 400 | −10 | 25 | 60 | 204 | 231 | 201 | 44 ± 1 | 58 ± 1 | 13 ± 1 | 110 ± 3 |
| cPEAEMA25PCL75 | 90 | 400 | 0 | 10 | 60 | 180 | 199 | 177 | 43 ± 1 | 59 ± 1 | 11 ± 1 | 120 ± 2 |

TABLE 8 bSME Properties of composites

| Sample ID | $Q_{ef}$ (%) | $\varepsilon'_{rev}$ (%) |
|---|---|---|
| ³PPDL⁴PCL(15,85) MNP | 15.6 | 4.0 |
| ³PPDL⁴PCL(20,80) MNP | 31.2 | 11.2 |
| ³PPDL⁴PCL(25,75) MNP | 42.2 | 31.5 |
| ³PPDL⁴PCL(15,85) OCLMNP1 | 62.6 | −1.3 |
| ³PPDL⁴PCL(20,80) OCLMNP1 | 71.8 | 2.2 |
| ³PPDL⁴PCL(25,75) OCLMNP1 | 71.2 | 2.0 |
| ³PPDL⁴PCL(15,85) OCLMNP2 | 45.0 | 1.2 |
| ³PPDL⁴PCL(20,80) OCLMNP2 | 52.6 | 4.9 |
| ³PPDL⁴PCL(25,75) OCLMNP2 | 56.6 | 2.3 |
| ³PPDL⁴PCL(15,85) OPDLMNP1 | 49.2 | 6.1 |
| ³PPDL⁴PCL(20,80) OPDLMNP1 | 61.4 | 2.1 |
| ³PPDL⁴PCL(25,75) OPDLMNP1 | 63.6 | 0.2 |
| ³PPDL⁴PCL(15,85) OPDLMNP2 | 71.2 | 1.9 |
| ³PPDL⁴PCL(20,80) OPDLMNP2 | 46.4 | 0.7 |
| ³PPDL⁴PCL(25,75) OPDLMNP2 | 53.6 | −1.3 |

REFERENCE SIGNS AND ABBREVIATIONS bSMP bidirectional shape-memory polymer
bSME bidirectional shape-memory effect
AD first domains (actuator domains)
SD second domains (skeleton domains)
ED third domains (elastic domains)
$T_{t,AD}$ transition temperature of the first domains AD
$T_{t,SD}$ transition temperature of the second domains SD
$T_{t,ED}$ transition temperature of the third domains ED
$T_{high}$ first temperature
$T_{low}$ second temperature

The invention claimed is:

1. An article comprising a bidirectional shape-memory polymer (bSMP), the bSMP comprising
   first phase-segregated domains (AD) having a first transition temperature ($T_{t,AD}$) corresponding to a crystallization transition or glass transition of the first domains (AD),
   second phase-segregated domains (SD) having a second transition temperature ($T_{t,SD}$) corresponding to a crystallization transition or glass transition of the second domains (SD), the second transition temperature ($T_{t,SD}$) being higher than the first transition temperature ($T_{t,AD}$), and
   covalent or non-covalent bonds cross-linking the polymer chains of the bSMP, and in this way interconnecting the first and second domains (AD, SD),
   wherein the second phase-segregated domains (SD) form a skeleton which is at least partially embedded in the first phase-segregated domains (AD), and wherein polymer chain segments of the bSMP forming the first domains (AD) are orientated in a common direction, such that the bSMP is able to undergo a reversible and bidirectional shape-shift between a first shape (A) at a first temperature ($T_{high}$) and a second shape (B) at a second temperature ($T_{low}$) upon variation of temperature between the first and second temperature ($T_{high}$, $T_{low}$) driven by the crystallization and melting or vitrification and melting of the first phase-separated domains (AD) and without application of an external stress, with $T_{low}<T_{t,AD}<T_{high}<T_{t,SD}$.

2. The article according to claim 1, wherein the bSMP further comprises:
   third phase-segregated domains (ED) having a third transition temperature ($T_{t,ED}$) corresponding to a glass transition of the third domains (ED), the third transition temperature ($T_{t,ED}$) being lower than the first transition temperature ($T_{t,AD}$), with $T_{t,ED}<T_{low}<T_{t,AD}$, wherein the third phase-segregated domains (ED), together with the first phase-segregated domains (AD), embeds the second phase-segregated domains (SD).

3. The article according to claim 2, wherein the bSMP is a blend or an interpenetrated polymer network and segments constituting the first domains (AD), the second domains (SD) and a third domain (ED) are located on different polymer chains.

4. The article according to claim 1, wherein at a temperature below the transition temperature ($T_{t,SD}$) of the second phase-segregated domains (SD), the article has an overall geometry which determines the first and the second shape (A, B) and which is fixed by the second phase-segregated domains (SD).

5. The article according to claim 1, wherein the first phase-segregated domains (AD) are formed by polymer segments that are chemically different to those of the second phase-segregated domains (SD).

6. The article according to claim 1, wherein the first phase-segregated domains (AD) are formed by polymer segments that are chemically identical to those of the second phase-segregated domains (SD).

7. The article according to claim 6, wherein an overall geometry is produced by deforming the bSMP by the application of an external stress, at a temperature ($T_{reset}$) which is higher than the transition temperature ($T_{t,SD}$) of the second domains (SD) so that the polymer is in a rubbery-elastic state, and cooling the deformed bSMP to a temperature below the transition temperature ($T_{t,SD}$) of the second domains (SD) or below the transition temperature ($T_{t,AD}$) of the first domains (AD) under maintaining the external stress.

8. The article according to claim 1, wherein polymer chain segments of the bSMP forming the second domains (SD) are orientated in a common direction.

9. The article according to claim 1, wherein the bSMP is a single polymer and the segments constituting the first domains (AD), the second domains (SD) are located on the same polymer chain.

10. The article according to claim 1, wherein the segments constituting the first domains (AD), the second domains (SD) are located on different polymer chains.

11. The article according to claim 1, comprising a composite material composed of the bSMP and a particulate material embedded therein, the particulate material being selected from magnetic particles, electrically conductive particles, infrared sensitive particles and microwave sensitive particles.

12. A method of preparing an article comprising a bidirectional shape-memory polymer (bSMP), the bSMP comprising:
    first phase-segregated domains (AD) having a first transition temperature ($T_{t,AD}$) corresponding to a crystallization transition or glass transition of the first domains (AD),
    second phase-segregated domains (SD) having a second transition temperature ($T_{t,SD}$) corresponding to a crystallization transition or glass transition of the second domains (SD), the second transition temperature ($T_{t,SD}$) being higher than the first transition temperature ($T_{t,AD}$), and
    covalent or non-covalent bonds cross-linking the polymer chains of the bSMP, and in this way interconnecting the first and second domains (AD, SD),
    wherein the second phase-segregated domains (SD) form a skeleton which is at least partially embedded in the first phase-segregated domains (AD), and wherein polymer chain segments of the bSMP forming the first domains (AD) are orientated in a common direction, such that the bSMP is able to undergo a reversible and bidirectional shape-shift between a first shape (A) at a first temperature ($T_{high}$) and a second shape (B) at a second temperature ($T_{low}$) upon variation of temperature between the first and second temperature ($T_{high}$, $T_{low}$) driven by the crystallization and melting or vitrification and melting of the first phase-separated domains (AD) and without application of an external stress, wherein at a temperature $T_{reset}$ the programmed shapes (A) and (B) are erased with $T_{low} < T_{t,AD} < T_{high} < T_{t,SD} < T_{reset}$,
    the method comprising the steps of
    providing a polymer comprising the first phase-segregated domains (AD) having the first transition temperature ($T_{t,AD}$), the second phase-segregated domains (SD) having the second transition temperature ($T_{t,SD}$), and the covalent or non-covalent bonds cross-linking the polymer chains of the bSMP,
    deforming the polymer by application of an external stress at a temperature ($T_{reset}$) which is higher than the transition temperature ($T_{t,SD}$) of the second domains (SD) so that the polymer is in a rubbery-elastic state,
    cooling the polymer to a temperature below the transition temperature ($T_{t,SD}$) of the second domains (SD) or below the transition temperature ($T_{t,AD}$) of the first domains (AD) under maintaining the external stress, thereby forming the structure defined above, and
    releasing the external stress.

13. The method of preparing an article according to claim 12, further comprising the step of heating the polymer to the first temperature ($T_{high}$) resulting in the first shape (A).

14. The method of preparing an article according to claim 12, wherein the deformation comprises an elongation, compression, bending of the polymer or any combination thereof.

15. The method of preparing an article according to claim 12, wherein the deformation comprises a surface texturing of the polymer or a smoothing of a textured surface structure of the polymer.

16. The method of using an article according to claim 12, comprising the steps of varying the temperature between a first temperature ($T_{high}$) and a second temperature ($T_{low}$) with $T_{low} < T_{t,AD} < T_{high} < T_{t,SD}$ without application of an external stress, such as to induce a reversible shape-shift of the bSMP between a first shape (A) at the first temperature ($T_{high}$) and a second shape (B) at the second temperature ($T_{low}$) driven by the crystallization and melting or the vitrification and melting of the first phase-segregated domains (AD).

* * * * *